(12) United States Patent
Kikuchi et al.

(10) Patent No.: US 11,005,356 B2
(45) Date of Patent: May 11, 2021

(54) POWER SUPPLY CONTROL DEVICE AND LLC RESONANT CONVERTER

(71) Applicant: Rohm Co., Ltd., Kyoto (JP)

(72) Inventors: Hiroki Kikuchi, Kyoto (JP); Hiroyuki Hatano, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/674,773

(22) Filed: Nov. 5, 2019

(65) Prior Publication Data
US 2020/0169160 A1 May 28, 2020

(30) Foreign Application Priority Data

Nov. 7, 2018 (JP) .............................. JP2018-209577
Nov. 7, 2018 (JP) .............................. JP2018-209583
Oct. 29, 2019 (JP) .............................. JP2019-196018

(51) Int. Cl.
H02M 1/08 (2006.01)
H02M 1/42 (2007.01)
H02M 3/335 (2006.01)

(52) U.S. Cl.
CPC .......... H02M 1/083 (2013.01); H02M 1/4208 (2013.01); H02M 3/33569 (2013.01)

(58) Field of Classification Search
CPC . H02M 1/083; H02M 1/4208; H02M 3/33569
See application file for complete search history.

(56) References Cited

U.S. PATENT DOCUMENTS

| 8,288,954 | B2* | 10/2012 | Melanson | H02M 3/33523 315/219 |
| 10,673,322 | B1* | 6/2020 | Giombanco | H02M 1/4225 |
| 2016/0141964 | A1* | 5/2016 | Yu | H02M 3/33507 363/21.02 |
| 2016/0365799 | A1* | 12/2016 | Nakano | H02M 3/33546 |
| 2016/0380530 | A1 | 12/2016 | Maruyama | |
| 2018/0248485 | A1* | 8/2018 | Chung | H02M 3/335 |
| 2018/0367029 | A1* | 12/2018 | Maruyama | H02M 1/32 |
| 2019/0044434 | A1* | 2/2019 | Elferich | H02M 1/4241 |
| 2019/0089254 | A1* | 3/2019 | Op Het Veld | H02M 3/335 |
| 2020/0117256 | A1* | 4/2020 | Yang | G06F 1/263 |

FOREIGN PATENT DOCUMENTS

| JP | 5911553 | 4/2016 |
| JP | 2017-017767 | 1/2017 |

* cited by examiner

Primary Examiner — Fred E Finch, III
Assistant Examiner — Kevin H Sprenger
(74) Attorney, Agent, or Firm — Fish & Richardson P.C.

(57) ABSTRACT

A power control device for controlling driving of an LLC resonant converter including a first switching element to one end of which an input voltage is applied, a second switching element of which one end is connected to the other end of the first switching element, and a primary winding and a resonant capacitor connected in series between a first connection node at which the first and second switching elements are connected together and the other end of the second switching element includes an on-timing controller that detects variation of a switching voltage detection signal based on a switching voltage appearing at the first connection node rising up to the input voltage and falling down to 0 V and that, based on the result of the detection, generates a high-side on-signal for turning on the first switching element and a low-side on-signal for turning on the second switching element.

11 Claims, 19 Drawing Sheets

Fig.4
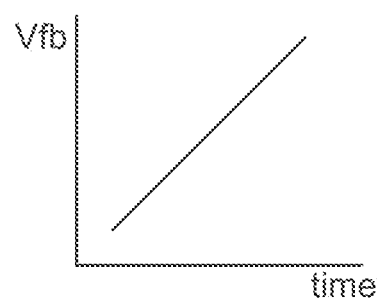
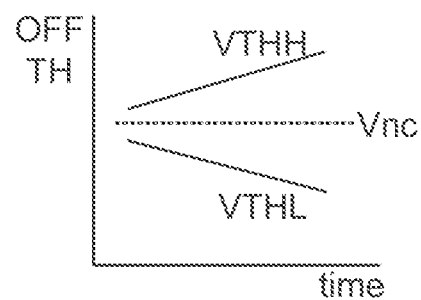

Fig.12
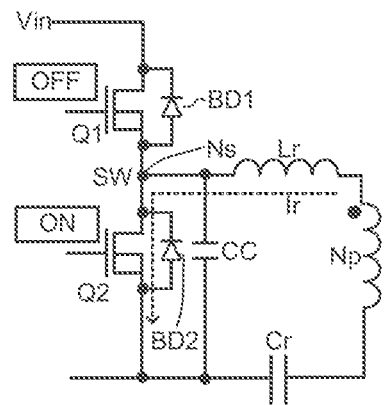
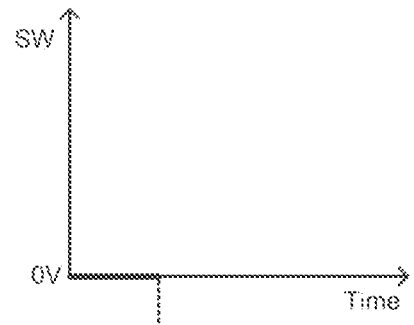
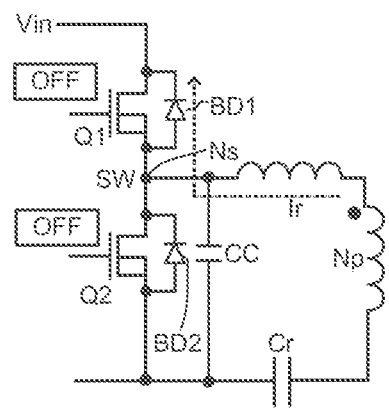
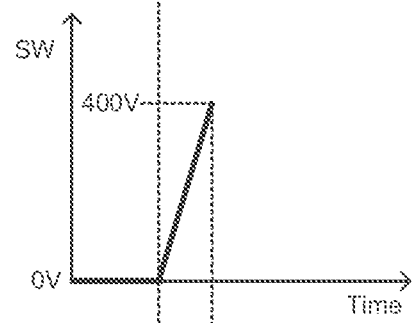
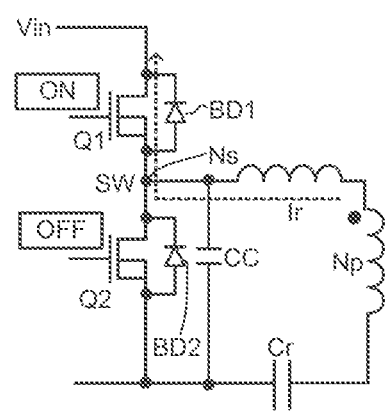
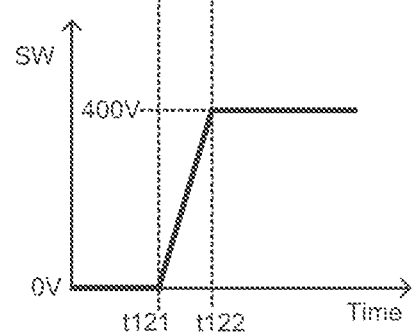

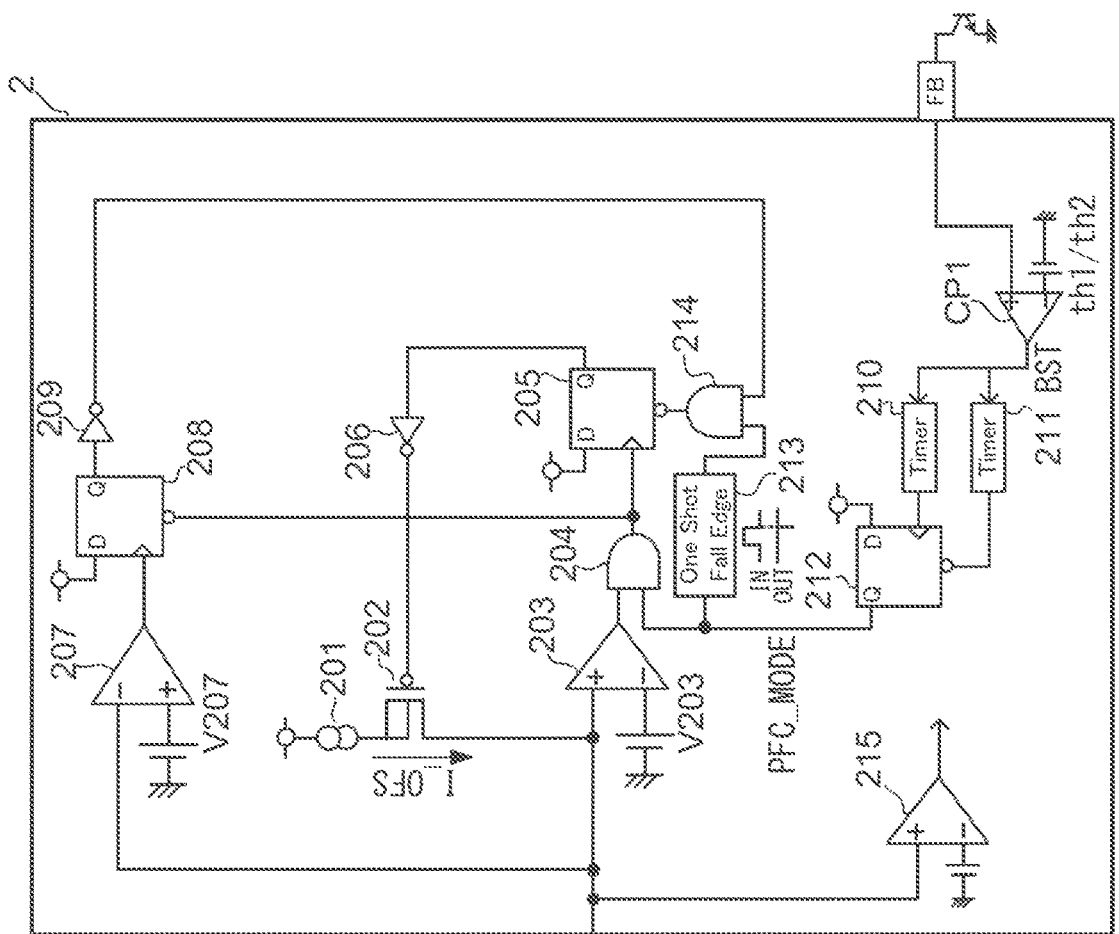
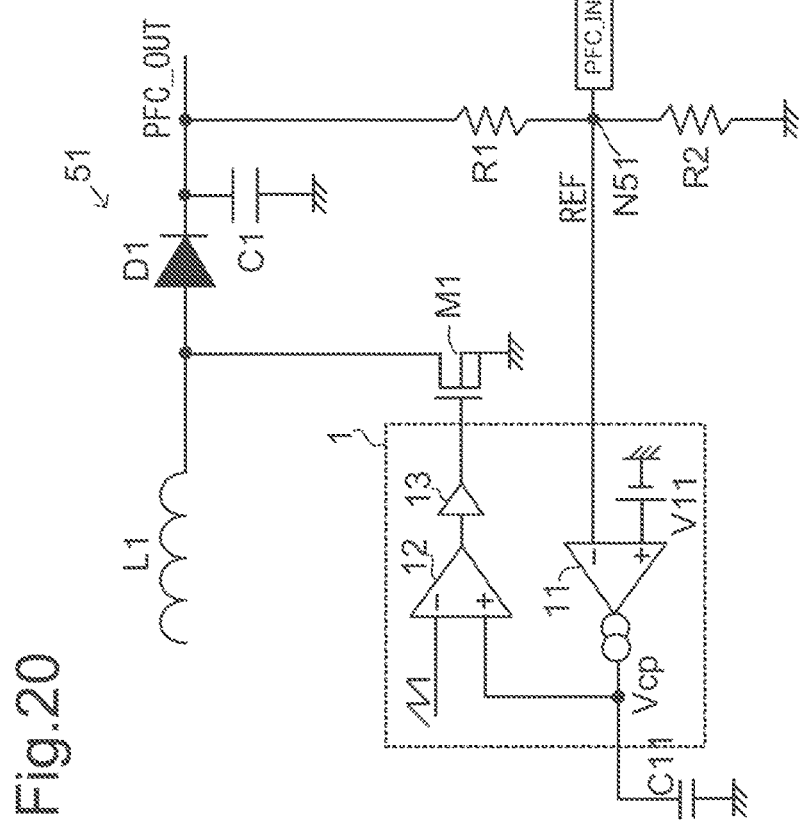
Fig.20

POWER SUPPLY CONTROL DEVICE AND LLC RESONANT CONVERTER

BACKGROUND OF THE INVENTION

This application is based on Japanese Patent Application No. 2018-209577 filed on Nov. 7, 2018, Japanese Patent Application No. 2018-209583 filed on Nov. 7, 2018, and Japanese Patent Application No. 2019-196018 filed on Oct. 29, 2019, contents of all of which are hereby incorporated by reference.

FIELD OF THE INVENTION

This invention relates to a power control device for LLC resonant converters.

DESCRIPTION OF THE RELATED ART

Conventionally, LLC-resonant-type DC-DC converters (hereinafter, referred to as LLC resonant converters) are known as one kind of DC-DC converters. The LLC resonant converter is an isolation-type switching power supply circuit.

In the LLC resonant converter, two switching elements are turned on and off complementarily. Meanwhile, it is preferable to provide a dead time during which the switching elements are both off.

An example of the LLC resonant converter in which a dead time is provided during switching is seen in Japanese Patent Application published as No. 5911553. In the LLC resonant converter disclosed in Japanese Patent Application published as No. 5911553, the dead time is secured for the period required to charge and discharge the electric charges of a parasitic capacitance of the switching element with the excitation current of a transformer, and thereby ZVS (zero-voltage switching) during turning on is achieved. This helps improve efficiency.

However, in Japanese Patent Application published as No. 5911553, the dead time is calculated according to a second formula based on the excitation current calculated according to a first formula, the parasitic capacitance of the switching element, and the voltage across a smoothing capacitor. Since the dead time is determined by calculation, there is a risk that the switching element is turned on at a time point deviated from the timing at which the voltage applied to the switching element (for example, the voltage between the drain and the source) actually becomes zero, and this may lower the accuracy of ZVS.

Thus, a first object of the present invention is to provide a power control device which allows the adjustment of the dead time to improve the accuracy of ZVS and thereby to improve efficiency.

Conventionally, as a circuit for generating the input voltage to a power supply circuit such as an LLC resonant converter, a PFC circuit (power factor improvement circuit) is used. An example of a conventional PFC circuit is seen in Japanese Patent Application published as No. 2017-17767. The PFC circuit in Japanese Patent Application published as No. 2017-17767 makes a switching element perform burst operation when the load of the PFC circuit is light to reduce switching loss and to improve efficiency.

More specifically, the control IC in the PFC circuit in Japanese Patent Application published as No. 2017-17767 includes an error amplifier, an AC-COMP synthesizing circuit, and a comparator. The error amplifier compares the voltage obtained by dividing the output voltage of the PFC circuit with a reference voltage. The output voltage of the error amplifier is applied to the COMP terminal. The AC-COMP synthesizing circuit, in accordance with a stand-by signal fed in from outside, switches whether to superpose the AC voltage waveform component from the VH terminal at the COMP terminal or not. The comparator compares the output of the AC-COMP synthesizing circuit with the output of a lamp oscillator, and by feeding the comparison output to the R (reset) terminal of an RSFF (flip-flop), controls switching operation of the switching element.

In this way, when the stand-by signal is High, a signal on which the AC waveform is superposed is fed from the AC-COMP synthesizing circuit, and only when the peak of the signal is higher than the lowest voltage of the lamp oscillator, the turning-on/off of the switching element is controlled so that burst operation is performed.

Inconveniently, however, when the PFC circuit in Japanese Patent Application published as No. 2017-17767 mentioned above is used together with a power supply circuit such as an LLC resonant converter, it is necessary to use a control IC having a special configuration such as an AC-COMP synthesizing circuit, and thus, usable control ICs are limited.

To cope with that, a second object of the present invention is to provide a power control device which can make a PFC circuit used together with a power supply circuit perform burst operation and which can improve the degree of freedom in terms of what controller to use to control the PFC circuit.

SUMMARY OF THE INVENTION

According to one aspect of the present invention, a power control device for controlling the driving of an LLC resonant converter includes: a first switching element to one end of which an input voltage is applied; a second switching element of which one end is connected to the other end of the first switching element; and a primary winding and a resonant capacitor connected in series between a first connection node at which the first and second switching elements are connected together and the other end of the second switching element. The power control device further includes an on-timing controller configured to detect variation of a switching voltage detection signal based on a rise of a switching voltage appearing at the first connection node up to the input voltage and a fall of the switching voltage down to 0 V and to generate, based on the result of the detection, a high-side on-signal for turning on the first switching element and a low-side on-signal for turning on the second switching element.

A power control device according to another aspect of the present invention is a power control device that controls the driving of a power supply circuit to which an output voltage from a PFC circuit (power factor improvement circuit) is fed, the PFC circuit including a switching element, voltage division resistors which divide the output voltage, and a controller configured to control the driving of the switching element based of a feedback voltage appearing at the connection node between the voltage division resistors. The power control device further includes a current feeder configured to alternate between a feeding state in which it feeds a current to the connection node and a non-feeding state. (A first configuration.)

In the first configuration described above, the current feeder may include: a first feeding state switch circuit configured, when the feedback voltage falls below a first reference voltage, to switch from the feeding state to the non-feeding state; and a second feeding state switch circuit configured, when the feedback voltage surpasses a second reference voltage lower than the first reference voltage, to switch from the non-feeding state to the feeding state. (A second configuration.)

In the second configuration described above, the first feeding state switch circuit may include: a first comparator which compares the feedback voltage with the first reference voltage; a first D flip-flop including a clock terminal to which the output of the first comparator is fed; a first inverter to which the output from the Q output terminal of the first D flip-flop is fed; a second D flip-flop including a reset terminal to which the output of the first inverter is fed; a second inverter to which the output of the second D flip-flop is fed; a constant current source; and a transistor which switches on and off the current from the constant current source in accordance with the output from the second inverter. The second feeding state switch circuit my include: a second comparator which compares the feedback voltage with the second reference voltage; the second D flip-flop including a clock terminal to which a signal based on the output of the second comparator is fed; the second inverter; the constant current source; and the transistor. (A third configuration.)

The third configuration described above may include: a burst detector for detecting burst operation of the power supply circuit; and a first AND circuit to which the output of the burst detector and the output of the second comparator are fed and which outputs a signal to the clock terminal of the second D flip-flop. (A fourth configuration.)

In the fourth configuration described above, the burst detector may include a hysteresis comparator which compares a second feedback voltage obtained by feeding back the output voltage of the power supply circuit with third and fourth reference voltages. (A fifth configuration.)

In the fifth configuration described above, the burst detector may include a timer configured, when the hysteresis comparator detects the second feedback voltage falling below the third reference voltage, to start counting, and on having counted a predetermined time before the hysteresis comparator detects the second feedback voltage surpassing the fourth reference voltage, to make the burst detector output a High-level signal. (A sixth configuration.)

Any one of the fourth to sixth configurations described above may include a falling edge detector configured, upon detecting the output of the burst detector being switched from High level to Low level, to output a Low-level signal momentarily and a second AND circuit configured to be fed with the output of the falling edge detector and the output of the first inverter to yield an output to the reset terminal of the second D flip-flop. (A seventh configuration.)

In the power control device of any one of the configurations described above as an IC package, a first external terminal which can be connected to the connection node may be included in a terminal group with a withstand voltage of the same level arranged along the same side of the IC package. (An eighth configuration.)

The eighth configuration described above may further include, arranged along the same side, a second external terminal which can be connected via a diode to an application terminal for application of an alternating-current voltage to the PFC circuit and a third external terminal which is a non-connect terminal, and the third external terminal may be arranged between the terminal group and the second external terminal. (A ninth configuration.)

The eighth or ninth configuration described above may have a UVLO (undervoltage lock-out) comparator connected to the first external terminal (A tenth configuration.)

According to another aspect of the present invention, preferably, a power supply circuit has the power control device of any one of the configurations described above. (An eleventh configuration.)

The power supply circuit according to the eleventh configuration described above may be an LLC resonant converter. (A twelfth configuration.)

According to another aspect of the present invention, an AC-DC converter has the power supply circuit of any one of the configurations described above and a PFC circuit arranged in a stage preceding the power supply circuit.

DESCRIPTION OF THE DRAWINGS

FIG. 4 is a schematic diagram showing a relationship between a feedback voltage and an off-threshold value;

FIG. 12 is a diagram showing behavior of a resonant current and a switching voltage at transition of switching status;

FIG. 20 is a circuit diagram showing a configuration of a principal portion related to a function for coordination with a PFC circuit in the power control IC.

DESCRIPTION OF THE PREFERRED EMBODIMENTS

Hereinafter, one embodiment of the present invention will be described with reference to the accompanying drawings.

1. Overall Configuration of an AC-DC Converter

Figure 1:
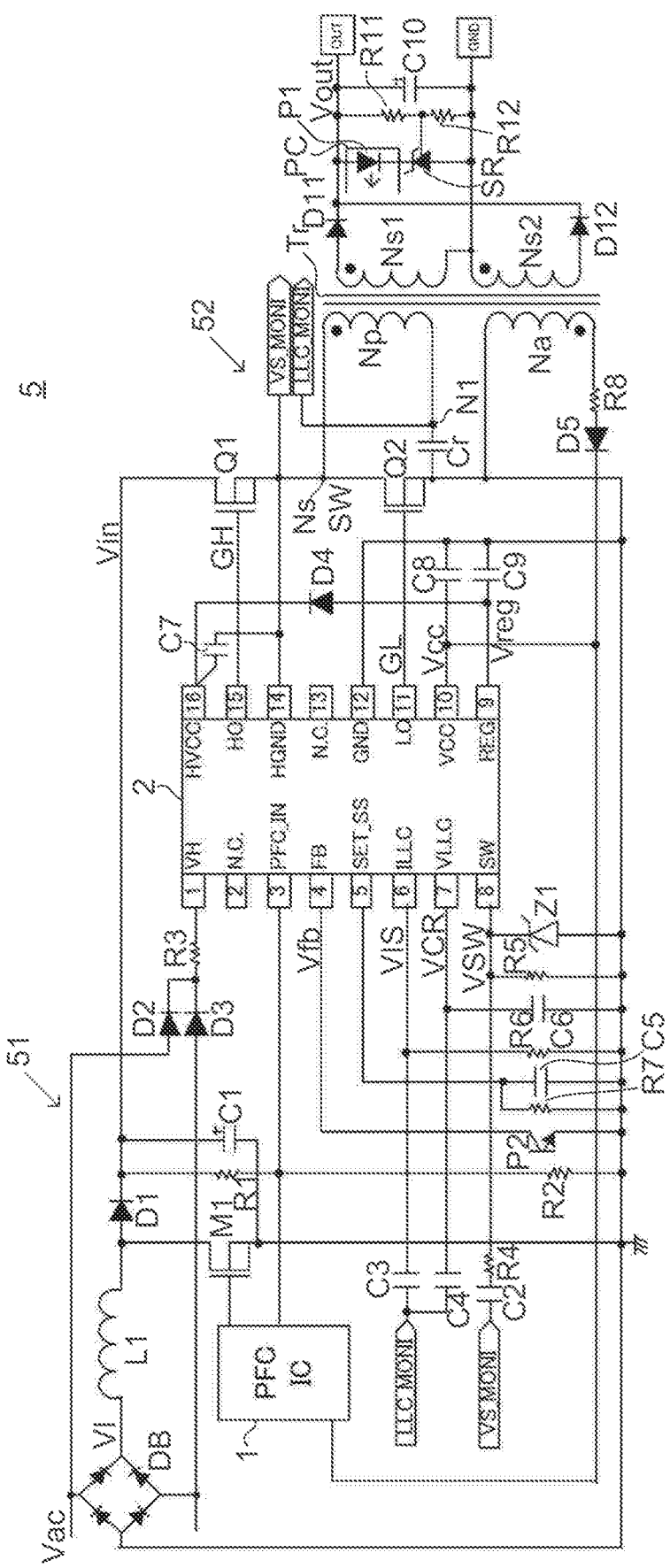
FIG. 1 is a circuit diagram showing a configuration of an AC-DC converter according to one embodiment of the present invention.

FIG. 1 is a circuit diagram showing the configuration of an AC-DC converter 5 according to one embodiment of the present invention. The AC-DC converter 5 is composed of, roughly divided, a power factor improvement circuit (PFC) 51 in a front stage and an LLC resonant converter 52 in a rear stage. The AC-DC converter 5 is applied to various power supplies such as those in consumer appliances (such as TVs, PCs, and servers), those for LED illumination, those in industrial appliances, and those for OA equipment (such as laser printers).

The power factor improvement circuit 51 is configured as a step-up chopper circuit and includes a diode bridge DB, an inductor L1, a diode D1, a capacitor C1, a switching element M1, a resistor R1, a resistor R2, and a PFC control IC 1.

To the input terminal of the diode bridge DB, an alternating-current voltage Vac is applied. The output terminal of the diode bridge DB is connected to one end of the inductor L1. The other end of the inductor L1 is connected to the anode of the diode D1. The connection node between the inductor L1 and the diode D1 is connected to the drain of the switching element M1, which is configured as an n-channel MOSFET. The source of the switching element M1 is connected to an application terminal for a ground potential. The cathode of the diode D1 is connected to one end of the capacitor C1. The other end of the capacitor C1 is connected to the application terminal for the ground potential.

The PFC control IC 1 controls the on/off driving of the switching element M1. When the switching element M1 is turned on, energy is accumulated in the inductor L1, and when the switching element M1 is turned off, a current flows from the inductor L1 to the output side via the diode D1, and energy in the inductor L1 is discharged.

The PFC control IC 1 receives, as a feedback voltage, a voltage which is obtained by dividing, with the resistors R1 and R2, the output voltage (=Vin) of the power factor improvement circuit 51 which appears at the cathode of the diode D1, and thereby drives the switching element M1 by PWM (pulse width modulation) control. Consequently, the peak of the inductor current that flows in the inductor L1 has the same waveform as the input voltage VI at the input side of the inductor L1 and this helps improve the power factor.

An input voltage Vin as the output of the power factor improvement circuit 51 is fed to the LLC resonant converter 52. The LLC resonant converter 52 converts the input voltage Vin to an output voltage Vout. The LLC resonant converter 52 includes switching elements Q1 and Q2, a transformer Tr, a resonant capacitor Cr, diodes D11 and D12, a shunt regulator SR, a photocoupler PC, resistors R11 and R12, an output capacitor C10, and a power control IC 2.

The LLC resonant converter 52 further includes resistors R3 to R8, capacitors C2 to C9, diodes D2 to D5, and a Zener diode Z1.

The power control IC (power control device) 2 drives and controls the LLC resonant converter 52. The power control IC 2 has various external terminals for establishing electrical connection with the outside. More specifically, the power control IC 2 has a VH terminal (pin-1), a non-connect terminal (pin-2), a PFC_IN terminal (pin-3), an FB terminal (pin-4), a SET_SS terminal (pin-5), an ILLC terminal (pin-6), a VLLC terminal (pin-7), an SW terminal (pin-8), a REG terminal (pin-9), a VCC terminal (pin-10), an LO terminal (pin-11), a GND terminal (pin-12), a non-connect terminal (pin-13), an HGND terminal (pin-14), an HO terminal (pin-15), and an HVCC terminal (pin-16).

The switching elements Q1 and Q2 are both configured as n-channel MOSFETs. To the drain of the switching element Q1, the input voltage Vin is applied. The source of the switching element Q1 is connected to the drain of the switching element Q2. The source of the switching element Q2 is connected to the application terminal for the ground potential.

The transformer Tr has a primary winding Np, secondary windings Ns1 and Ns2, and an auxiliary winding Na. The connection node Ns at which the switching elements Q1 and Q2 are connected together is connected to one end of the primary winding Np. The other end of the primary winding Np is connected to one end of the resonant capacitor Cr. The other end of the resonant capacitor Cr is connected to the source of the switching element Q2.

One end of the secondary winding Ns1 is connected to the anode of the diode D11. One end of the secondary winding Ns2 is connected to the anode of the diode D12. The connection node at which the other ends of the secondary windings Ns1 and Ns2 are connected together are connected to an application terminal GND to which the ground potential is applied.

The cathode of the diode D11 is connected to the cathode of the diode D12. The cathode of the diode D11 is, together with one end of the capacitor C10, connected to an output terminal OUT. The other end of the capacitor C10 is connected to the application terminal GND. In this way, the secondary side of the LLC resonant converter 52 is configured as a rectifying and smoothing circuit. The output voltage Vout appears at the output terminal OUT.

Between the output terminal OUT and the application terminal GND, the resistors R11 and R12 are connected in series. Between the output terminal OUT and the application terminal GND, in addition, a light-emitting element P1 included in the photocoupler PC and the shunt regulator SR are arranged. The output terminal OUT is connected to the anode of the light-emitting element P1. The cathode of the light-emitting element P1 is connected to the cathode of the shunt regulator SR. The anode of the shunt regulator SR is connected to the application terminal GND.

The shunt regulator SR compares a division voltage obtained by dividing the output voltage Vout with the resistors R11 and R12 with a reference voltage, and generates, between the cathode and the anode of the shut regulator SR, a current in accordance with the difference of the division voltage from the reference voltage. With the generated current, the light-emitting element P1 emits light. Feedback operation is thereby performed such that, the lower the output voltage Vout (the heavier the load), the smaller the amount of light emitted by the light-emitting element P1.

A light-receiving element P2 included in the photocoupler PC receives the light emitted by the light-emitting element P1. One end of the light-receiving element P2 is connected to the FB terminal of the power control IC 2, and the other end of the light-receiving element P2 is connected to the application terminal for the ground potential. The current passing through the light-receiving element P2 generates a feedback voltage Vfb at the FB terminal. With this configuration, the output voltage Vout is fed back as the feedback voltage Vfb.

The LLC resonant converter 52 increases leakage inductance by reducing the coupling coefficient of the transformer Tr to use the leakage inductance along with excitation inductance. The leakage inductance is used as a resonant inductor. A separate resonant inductor may be connected in series with the primary winding Np.

The high-side and low-side switching elements Q1 and Q2 are turned on and off complementarily by gate driving signals GH and GL respectively. Here, "complementarily" includes switching operation in which a dead time is reserved during which the switching elements are both off. The on-duty ratios of the switching elements Q1 and Q2 are both substantially 50%.

One input terminal of the diode bridge DB is connected to the anode of the diode D2, and the other input terminal of the diode bridge DB is connected to the anode of the diode D3. The cathodes of the diodes D2 and D3 are connected to one end of the resistor R3. The other end of the resistor R3 is connected to the VH terminal. The alternating-current voltage Vac is thus subjected to full-wave rectification by the diodes D2 and D3 and is then fed to the VH terminal. The VH terminal is used, during start-up, for charging a capacitor C8, which will be described later, to start up the power control IC 2.

The PFC_IN terminal is connected to the connection node between the resistors R1 and R2.

The SET_SS terminal is connected to one end of the capacitor C5. The other end of the capacitor C5 is connected to the application terminal for the ground potential. The resistor R7 is connected in parallel with the capacitor C5. The SET_SS terminal is used for setting soft starting, which will be described later.

The connection node N1 between the primary winding Np and the resonant capacitor Cr is connected to one end of the capacitor C3. The other end of the capacitor C3 is connected to one end of the resistor R6. The other end of the resistor R6 is connected to the application terminal for the ground potential. The ILLC terminal is connected to the connection node between the capacitor C3 and the resistor R6. At the ILLC terminal, a resonant current detection signal VIS obtained by converting a resonant current into a voltage signal appears.

The connection node N1 is connected also to one end of the capacitor C4. The other end of the capacitor C4 is connected to one end of the capacitor C6. The other end of the capacitor C6 is connected to the application terminal for the ground potential. The VLLC terminal is connected to the connection node between the capacitors C4 and C6. At the VLLC terminal, a resonant voltage detection signal VCR appears.

The connection node Ns is connected to one end of the capacitor C2. The other end of the capacitor C2 is connected to one end of the resistor R4. The other end of the resistor R4 is connected to one end of the resistor R5. The other end of the resistor R5 is connected to the application terminal for the ground potential. The connection node between the resistors R4 and R5 is connected to the SW terminal. To the SW terminal, the cathode of the Zener diode Z1 is connected. The anode of the Zener diode Z1 is connected to the application terminal for the ground potential. The resistors R4 and R5 are voltage division resistors. When no voltage dividing is necessary, the resistor R4 does not necessarily need to be provided.

A switching voltage SW appearing at the connection node Ns rises from 0 V to the input voltage Vin or falls from the input voltage Vin to 0 V when the switching elements Q1 and Q2 are both off through the charging or discharging of parasitic capacitances. At the SW terminal, a switching voltage detection signal VSW appears upon detecting such a rise and a fall of the switching voltage SW. The Zener diode Z1 clamps the switching voltage detection signal VSW with its forward voltage when the switching voltage detection signal VSW is negative.

The REG terminal is connected to one end of the capacitor C9. The other end of the capacitor C9 is connected to the application terminal for the ground potential. At the REG terminal, an internal voltage Vreg appears.

The VCC terminal is connected to one end of the capacitor C8. The other end of the capacitor C8 is connected to the application terminal for the ground potential. One end of the auxiliary winding Na is connected to the application terminal for the ground potential. The other end of the auxiliary winding Na is connected to the anode of the diode D5 via the resistor R8. The cathode of the diode D5 is connected to the connection node between the VCC terminal and the capacitor C8. Thus, the voltage generated in the auxiliary winding Na is rectified and smoothed by the diode D5 and the capacitor C8 to become a supply voltage Vcc appearing at the VCC terminal. The supply voltage Vcc is used also as a power source for the PFC control IC 1.

The LO terminal is connected to the gate of the switching element Q2. The gate of the switching element Q2 is driven by the gate driving signal GL fed from the LO terminal. The GND terminal is connected to the application terminal for the ground potential.

The HGND terminal is connected to the connection node Ns. The capacitor C7 is connected between the HVCC terminal and the HGND terminal. The anode of the diode D4 is connected to the connection node between the REG terminal and the capacitor C9. The cathode of the diode D4 is connected to the HVCC terminal. The capacitor C7 and the diode D4 are used for bootstrapping to generate, for turning on the switching element Q1, the gate driving signal GH with a voltage higher than the drain voltage (=Vin).

The HO terminal is connected to the gate of the switching element Q1. The gate of the switching element Q1 is driven by the gate driving signal GH fed from the HO terminal.

2. Configuration of a Feedback Path

Figure 2:
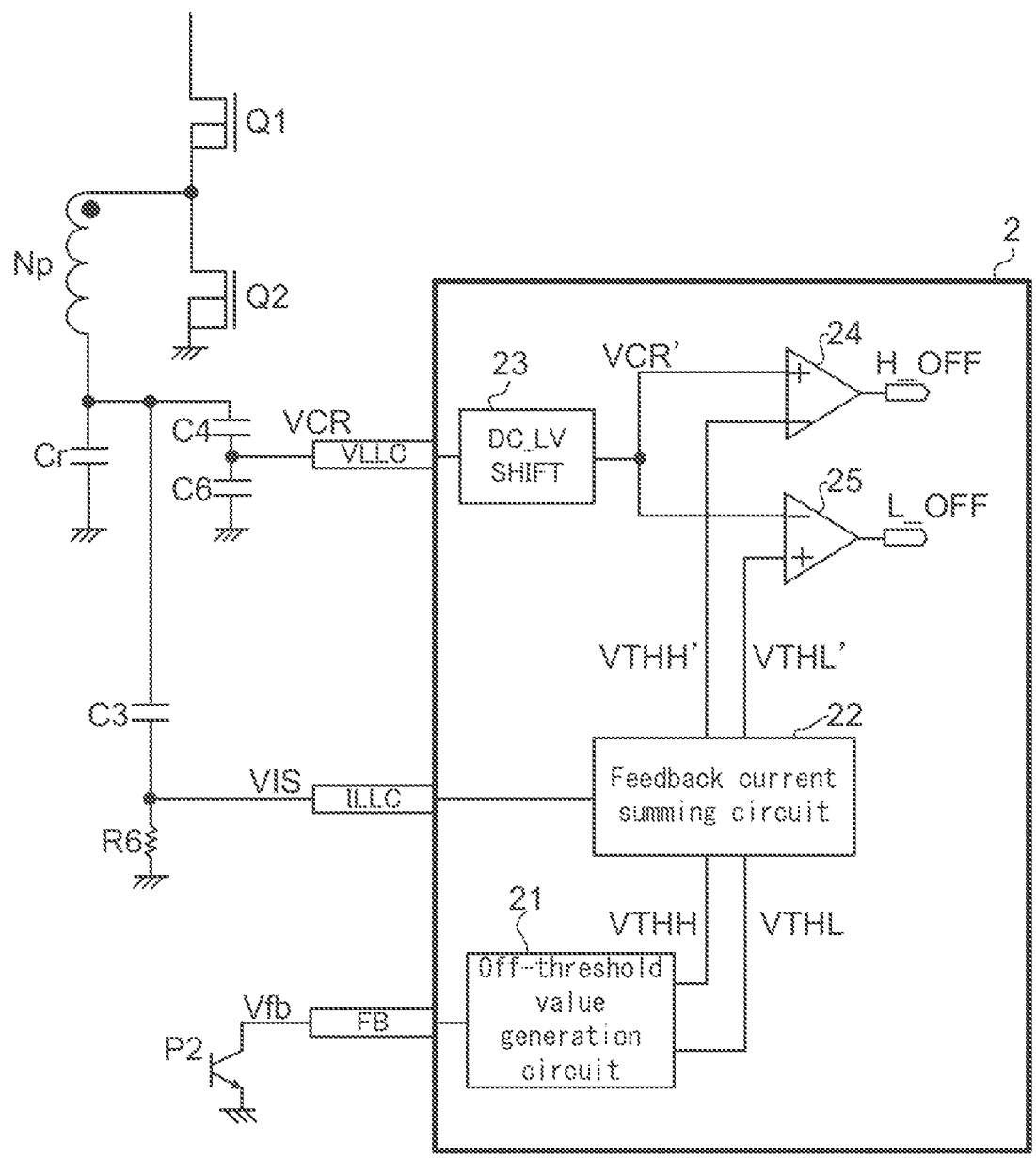
FIG. 2 is a schematic diagram showing a principal portion of a configuration for determining the off-timing of switching in a power control IC.

Next, the configuration of a feedback path in the power control IC 2 will be described in detail. FIG. 2 is a schematic diagram showing a principal portion of the configuration for determining the off-timing of switching in the power control IC 2.

As shown in FIG. 2, the power control IC 2 includes an off-threshold value generation circuit 21, a feedback current summing circuit 22, a DC level shift circuit 23, a high-side comparator 24, and a low-side comparator 25.

The off-threshold value generation circuit 21, based on the feedback voltage Vfb appearing at the FB terminal, generates a high-side off-threshold value VTHH and a low-side off-threshold value VTHL. The feedback current summing circuit 22 generates a high-side off-threshold value VTHH' by adding the resonant current detection signal VIS appearing at the ILLC terminal to the high-side off-threshold value VTHH, and generates a low-side off-threshold value VTHL' by adding the resonant current detection signal VIS to the low-side off-threshold value VTHL.

The DC level shift circuit 23 applies a level shift to the resonant voltage detection signal VCR appearing at the VLLC terminal to output a level-shifted resonant voltage detection signal VCR'. To the non-inverting input terminal (+) of the high-side comparator 24, the resonant voltage detection signal VCR' is fed, and to the inverting input terminal (−) of the high-side comparator 24, the high-side off-threshold value VTHH' is fed. At the time point that the resonant voltage detection signal VCR' exceeds the high-side off-threshold value VTHH', the high-side comparator 24 feeds a high-side off-signal H_OFF which has just been switched from Low to High. This turns the switching element Q1 from on to off.

On the other hand, to the inverting input terminal of the low-side comparator 25, the resonant voltage detection signal VCR' is fed, and to the non-inverting input terminal of the low-side comparator 25, the low-side off-threshold value VTHL' is fed. At the time point that the resonant voltage detection signal VCR' drops below the high-side off-threshold value VTHH', the low-side comparator 25 feeds a low-side off-signal L_OFF which has just been switched from Low to High. This turns the switching element Q2 from on to off With such a feedback configuration, the off-timing of the switching elements Q1 and Q2 is determined, and the output voltage Vout is controlled so as to remain equal to the target value. In particular, in this embodiment, the feedback path includes information on the resonant current, and this enhances the load response of the LLC resonant converter 52 and makes phase compensation designing easy.

3. Configuration of the Off-Threshold Value Generation Circuit

Figure 3:
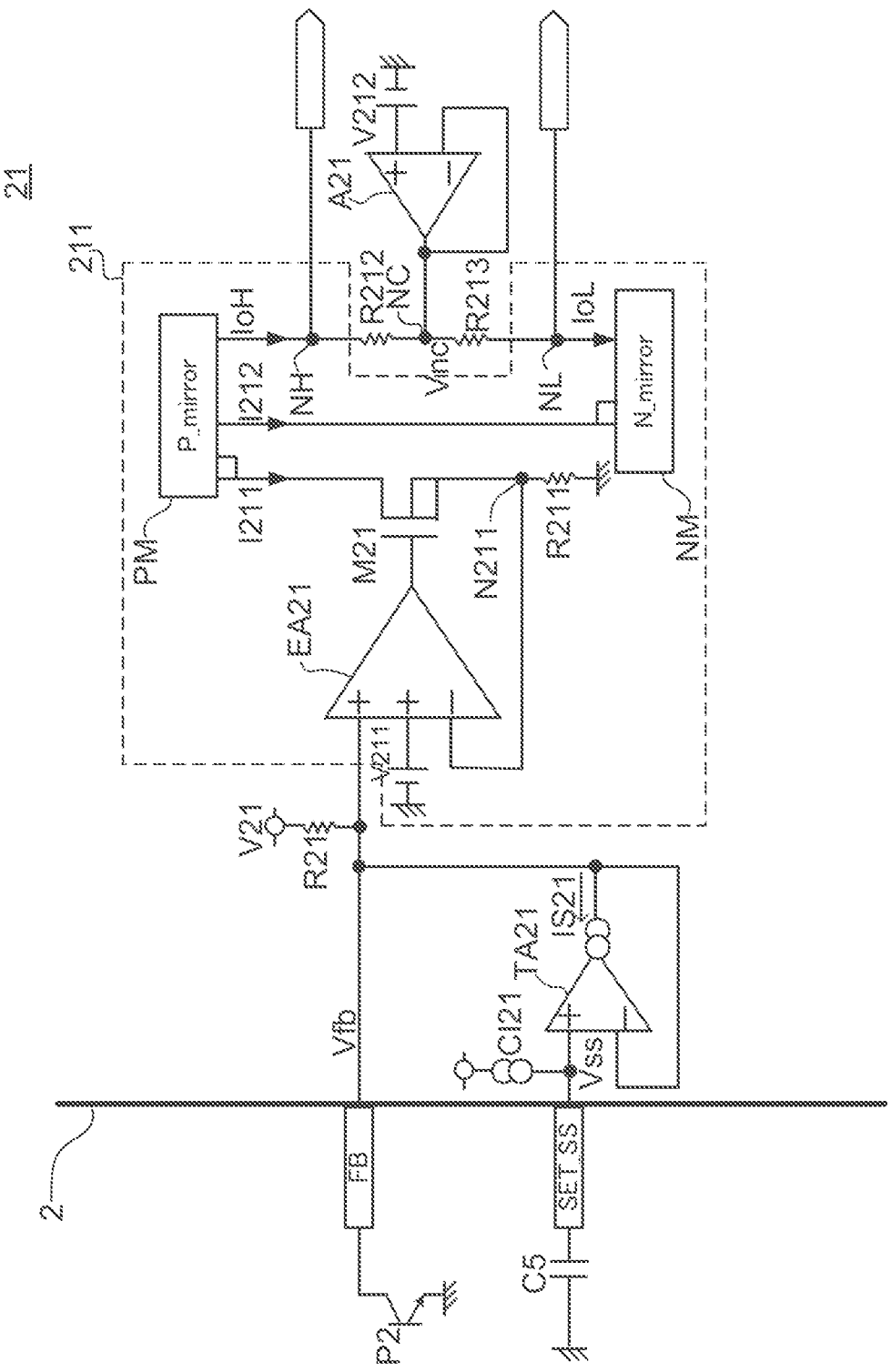
FIG. 3 is a circuit diagram showing one configuration example of an off-threshold value generation circuit.

Next, a specific configuration example of the off-threshold value generation circuit 21 mentioned above will be described in detail. FIG. 3 is a circuit diagram showing one configuration example of the off-threshold value generation circuit 21.

The off-threshold value generation circuit 21 shown in FIG. 3 includes an output current generation circuit 211, a resistor R21, a constant current source CI21, a transconductance amplifier TA21, a resistor R212, a resistor R213, and an operational amplifier A21.

To one end of the resistor R21, a predetermined supply voltage V21 is applied, and the other end of the resistor R21 is connected to the FB terminal. A current passes through the resistor R21 in accordance with the current passing through the light-receiving element P2 and thereby generates the feedback voltage Vfb.

The output current generation circuit 211 is a circuit which, based on the feedback voltage Vfb, generates a high-side output current IoH and a low-side output current IoL. The output current generation circuit 211 includes, for one example, an error amplifier EA21, a transistor M21, a resistor R211, a high-side current mirror PM, and a low-side current mirror NM.

To one non-inverting input terminal of the error amplifier EA21, the feedback voltage Vfb is applied, and to the other non-inverting input terminal of the error amplifier EA21, a predetermined reference voltage V211 is applied. The output terminal of the error amplifier EA21 is connected to the gate of the transistor M21 configured as an n-channel MOSFET. The source of the transistor M21 is connected via the resistor R211 to the application terminal of the ground potential. The connection node N211 between the source of the transistor M21 and the resistor R211 is connected to the inverting input terminal of the error amplifier EA21.

The error amplifier EA21 compares the higher of the voltages applied to the two non-inverting input terminals with the voltage at the inverting input terminal. As a result, when the feedback voltage Vfb is higher than the reference voltage V211, the voltage of the connection node N211 is controlled so as to remain equal to the feedback voltage Vfb. Otherwise, the voltage of the connection node N211 is controlled so as to remain equal to the reference voltage V211. Thus, the reference voltage V211 defines the lowest value of the voltage at the connection node N211.

The drain of the transistor M21 is connected to the input terminal of the high-side current mirror PM. One output terminal of the high-side current mirror PM is connected to the input terminal of the low-side current mirror NM, and the other output terminal of the high-side current mirror PM is connected to one end of the resistor R212 at the connection node NH. The output terminal of the low-side current mirror NM is connected to one end of the resistor R213 at the connection node NL.

A current I211 flows via the resistor R211 in accordance with the voltage at the connection node N211. The high-side current mirror PM takes the current I211 as the input and outputs a current I212 and the high-side output current IoH. The low-side current mirror NM takes the current I212 as the input and outputs the low-side output current IoL.

The connection node NC between the resistors R212 and R213 is connected to the output terminal of an operational amplifier A21. To the non-inverting input terminal of the operational amplifier A21, a predetermined reference voltage V212 is applied. The output terminal of the operational amplifier A21 is connected to the inverting input terminal of the operational amplifier A21. In this way, a voltage follower is formed by the operational amplifier A21, and thus a voltage Vnc equal to the reference voltage V212 appears at the connection node NC.

To the connection node NH, a voltage higher than the voltage Vnc by the voltage drop across the resistor R212 in accordance with the high-side output current IoH appears as the high-side off-threshold value VTHH (FIG. 2). To the connection node NL, a voltage lower than the voltage Vnc by the voltage drop across the resistor R213 in accordance with the low-side output current IoL appears as the low-side off-threshold value VTHL (FIG. 2).

Accordingly, as schematically shown in FIG. 4, the higher the feedback voltage Vfb, the larger the deviation between the high-side off-threshold value VTHH and the low-side off-threshold value VTHL with respect to the voltage Vnc (=V212) as the center.

In the configuration shown in FIG. 3, the non-inverting input terminal of the transconductance amplifier TA21 is connected to the SET_SS terminal. A constant current from the constant current source CI21 flows into the connection node between the transconductance amplifier TA21 and the SET_SS terminal. The output terminal of the transconductance amplifier TA21 is connected to the connection node between the FB terminal and the resistor R21 as well as to the inverting input terminal of the transconductance amplifier TA21. The transconductance amplifier TA21 only absorbs a sink current IS21 via the output terminal and does not discharge a source current via the output terminal.

Figure 5:
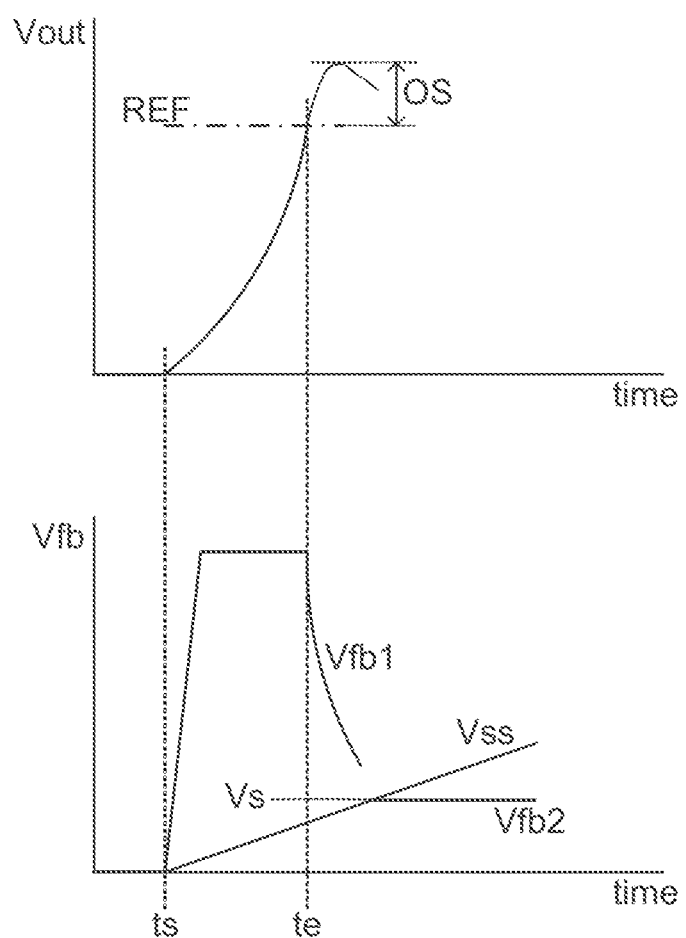
FIG. 5 is a timing chart illustrating soft starting function.

Such a configuration using the transconductance amplifier TA21 is aimed at achieving soft starting, which will be described in detail with reference also to the timing charts in FIG. 5. The waveform of the output voltage Vout and the waveform of the feedback voltage Vfb1 shown in FIG. 5 are those observed in a case where, for the sake of discussion, no soft starting function is provided. In this case, when the power control IC 2 starts up at a time point ts, the feedback voltage Vfb1 rises from 0 V to the supply voltage V21, and the output voltage Vout rises from 0 V.

Then, at a time point to at which the output voltage Vout reaches a target value REF, the feedback voltage Vfb1 falls down to a stable value. However, since the fall takes time, an overshoot OS occurs in the output voltage Vout as shown in FIG. 5.

By contrast, in this embodiment, at the start-up time point ts, the capacitor C5 externally connected to the SET_SS terminal starts to be charged by the constant current source CI21, and the voltage Vss (FIG. 5) appearing at the SET_SS terminal starts to rise. Here, even if the feedback voltage Vfb (Vfb2 in FIG. 5) tends to surpass the voltage Vss, due to absorption of the sink current IS21 by the transconductance amplifier TA21, the feedback voltage Vfb is controlled so as to remain equal to the voltage Vss. Thus, the voltage Vss and the feedback voltage Vfb rise while remaining equal.

Once the feedback voltage Vfb reaches the stable value Vs, thereafter even if the voltage Vss rises further, the feedback voltage Vfb remains at the stable values Vs, and thus the voltage Vss and the feedback voltage Vfb deviate from each other. Here, the output voltage Vout exhibits no overshoot.

4. Configuration of Feedback Current Summing Circuit

Figure 6:
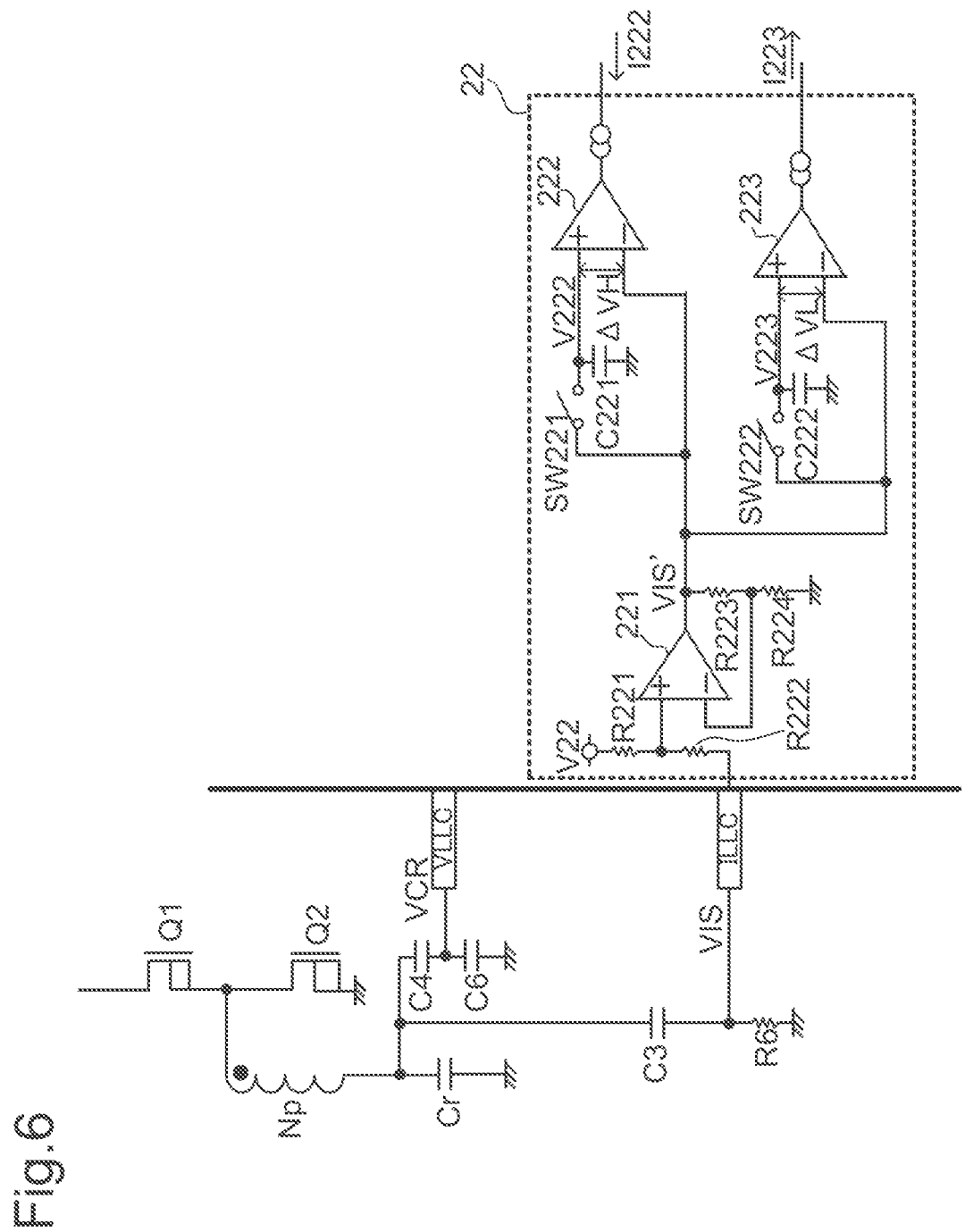
FIG. 6 is a circuit diagram showing one configuration example of a feedback current summing circuit.

Next, a configuration example of the feedback current summing circuit 22 mentioned above will be described in detail. FIG. 6 is a circuit diagram showing one configuration example of the feedback current summing circuit 22.

The feedback current summing circuit 22 shown in FIG. 6 includes resistors R221 to R224, an error amplifier 221, a capacitor C221, a transconductance amplifier 222, a capacitor C222, a transconductance amplifier 223, and switches SW221 and SW222.

Between an application terminal for a predetermined supply voltage V22 and the ILCC terminal, the resistors R221 and R222 are connected in series. The connection node between the resistors R221 and R222 is connected to the non-inverting input terminal of the error amplifier 221. Between the output terminal of the error amplifier 221 and an application terminal for the ground potential, the resistors R223 and R224 are connected in series. The connection node between the resistors R223 and R224 is connected to the inverting input terminal of the error amplifier 221.

Figure 7:
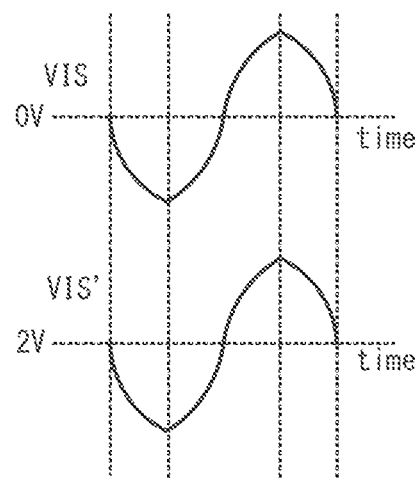
FIG. 7 is a timing chart showing one example a level shift of a resonant current detection signal.

Consequently, when, for example, the resistance ratio of the resistor R221 to the resistor R222 is 1:1 and the resistance ratio of the resistor R223 to the resistor R224 is also 1:1, while the resonant current detection signal VIS shown in FIG. 7 is centered around 0 V, a resonant current detection signal VIS' centered around the voltage equal to the supply voltage V22 (2 V as an example in FIG. 7) appears at the output terminal of the error amplifier 221. That is, the resonant current detection signal VIS is level-shifted to the resonant current detection signal VIS'.

The output terminal of the error amplifier 221 is connected to the inverting input terminal of the transconductance amplifier 222 as well as to the non-inverting input terminal of the transconductance amplifier 222 via the switch SW221. To the connection node between the switch SW221 and the transconductance amplifier 222, one end of the capacitor C221 is connected. The other end of the capacitor C221 is connected to the application terminal for the ground potential. The switch SW221 and the capacitor C221 constitute a sample-and-hold circuit.

Figure 8:
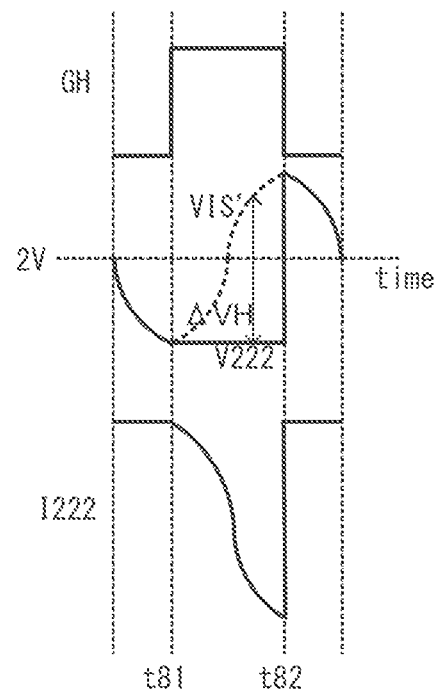
FIG. 8 is a timing chart showing generation of a sink current in the feedback current summing circuit.

As shown in the timing chart in FIG. 8, at the time point t81 at which the gate driving signal GH is switched from Low to High and the switching element Q1 is turned from off to on, the switch SW221 is turned from on to off, and thus the voltage V222 appearing at the non-inverting input terminal of the transconductance amplifier 222 is held at the value of the resonant current detection signal VIS' at the switching time point. On the other hand, to the inverting input terminal of the transconductance amplifier 222, the resonant current detection signal VIS' is fed as it is (the broken line in FIG. 8).

The transconductance amplifier 222 absorbs a sink current I222 with a current value proportional to the difference ΔVH between the voltage at the non-inverting input terminal and the voltage at the inverting input terminal. Thus, as shown in FIG. 8, as the difference ΔVH increases starting at the time point t81, the sink current I222 increases.

At the time point t82 at which the gate driving signal GH is switched from High to Low and the switching element Q1 is turned from on to off, the switch SW221 is turned from off to on. As a result, the voltage V222 equals to the resonant current detection signal VIS'. Thus, the difference ΔVH becomes zero, and the sink current I222 stops flowing.

On the other hand, the output terminal of the error amplifier 221 is connected to the inverting input terminal of the transconductance amplifier 223 as well as to the non-inverting input terminal of the transconductance amplifier 223 via the switch SW222. To the connection node between the switch SW222 and the transconductance amplifier 223, one end of the capacitor C222 is connected. The other end of the capacitor C222 is connected to the application terminal for the ground potential. The switch SW222 and the capacitor C222 constitute a sample-and-hold circuit.

Figure 9:
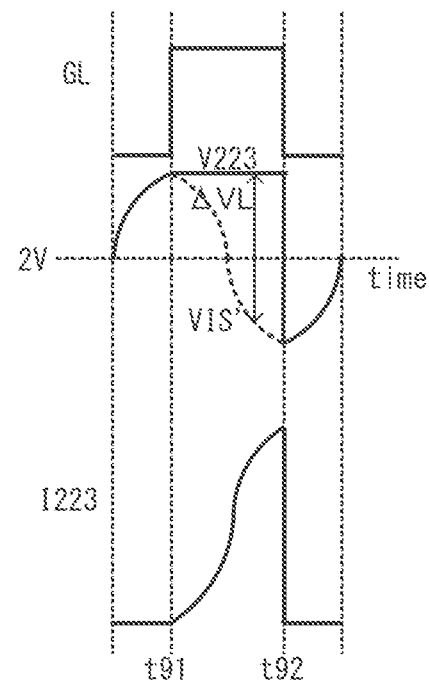
FIG. 9 is a timing chart showing generation of a source current in the feedback current summing circuit.

As shown in the timing charts in FIG. 9, at a time point t91 at which the gate driving signal GL is switched from Low to High and the switching element Q2 is turned from off to on, the switch SW222 is turned from on to off, and thus the voltage V223 appearing at the non-inverting input terminal of the transconductance amplifier 223 is held at the value of the resonant current detection signal VIS' at the switching time point. On the other hand, to the inverting input terminal of the transconductance amplifier 223, the resonant current detection signal VIS' is fed as it is (the broken line in FIG. 9).

The transconductance amplifier 223 discharges a source current I223 with a current value proportional to the difference ΔVL between the voltage at the non-inverting input terminal and the voltage at the inverting input terminal. Accordingly, as shown in FIG. 9, as the difference ΔVL increases starting at the time point t91, the source current I223 increases.

At a time point t92 at which the gate driving signal GL is switched from High to Low and the switching element Q2 is turned from on to off, the switch SW222 is turned from off to on. As a result, the voltage V223 equals to the resonant current detection signal VIS'. Thus, the difference ΔVL becomes zero, and the source current I223 stops flowing.

5. Determining the Off-Timing of the Switching Element

Figure 10:
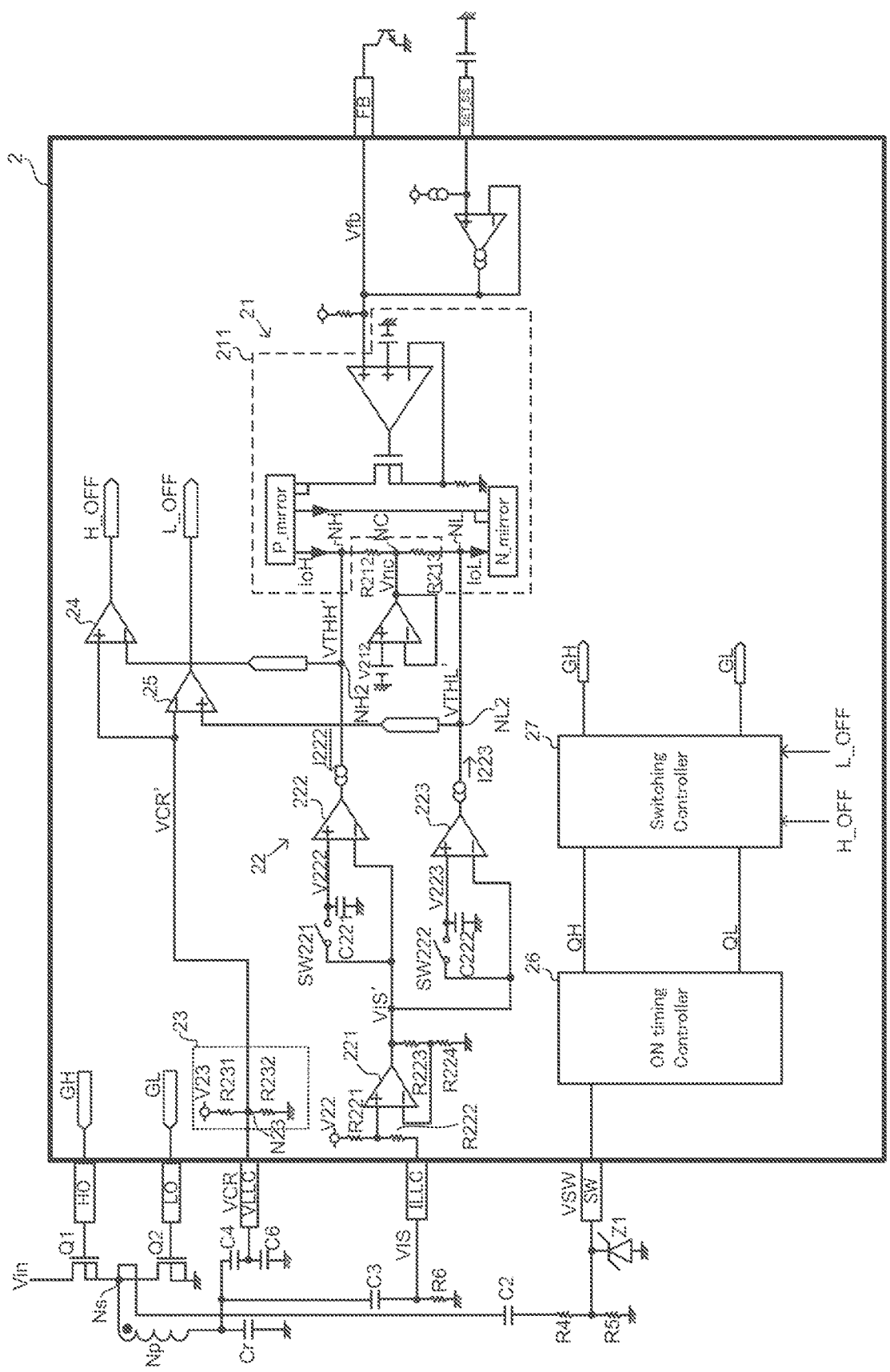
FIG. 10 is a circuit diagram showing one configuration example of the power control IC.

FIG. 10 is a circuit diagram showing a more specific internal configuration of the power control IC 2. As shown in FIG. 10, in the power control IC 2, the off-threshold value generation circuit 21 and the feedback current summing circuit 22 described above are connected together. More specifically, the connection node NH and the output terminal of the transconductance amplifier 222 are connected together at the connection node NH2, and the connection node NL and the output terminal of the transconductance amplifier 223 are connected together at the connection node NL2.

The high-side off-threshold value VTHH' (FIG. 2) appears at the connection node NH2, and the low-side off-threshold value VTHL' (FIG. 2) appears at the connection node NL2.

When the sink current I222 does not flow, the high-side output current IoH as it is flows through the resistor R212, and the high-side off-threshold value VTHH' equals the high-side off-threshold value VTHH. As the flow of the sink current I222 increases, the current that flows through the resistor R212 decreases, and thus the high-side off-threshold value VTHH' becomes lower than the high-side off-threshold value VTHH.

When the source current I223 does not flow, the low-side output current IoL as it is flows through the resistor R213, and the low-side off-threshold value VTHL' equals the low-side off-threshold value VTHL. As the flow of the source current I223 increases, the current that flows through the resistor R213 decreases, and thus the low-side off-threshold value VTHL' becomes higher than the low-side off-threshold value VTHL.

Here, as shown in FIG. 10, the DC level shift circuit 23 (FIG. 2) is composed of the resistors R231 and R232 connected in series between the application terminal for the supply voltage V23 and the application terminal for the ground potential. The connection node N23 between the resistors R231 and R232 is connected to the VLLC terminal.

With such a DC level shift circuit 23, the resonant voltage detection signal VCR centered around 0 V that appears at the VLLC terminal is level-shifted to the resonant voltage detection signal VCR' centered around the voltage resulting from the supply voltage V23 being divided by the resistors R231 and R232.

The connection node N23 is connected to the non-inverting input terminal of the high-side comparator 24 as well as to the inverting input terminal of the low-side comparator 25. The connection node NH2 is connected to the non-inverting input terminal of the high-side comparator 24, and the connection node NL2 is connected to the non-inverting input terminal of the low-side comparator 25. In this way, the high-side comparator 24 compares the resonant voltage detection signal VCR' with the high-side off-threshold value VTHH' to output the high-side off-signal H_OFF as a comparison result. The low-side comparator 25 compares the resonant voltage detection signal VCR' with the low-side off-threshold value VTHL' to output the low-side off-signal L_OFF as a comparison result.

Figure 11:
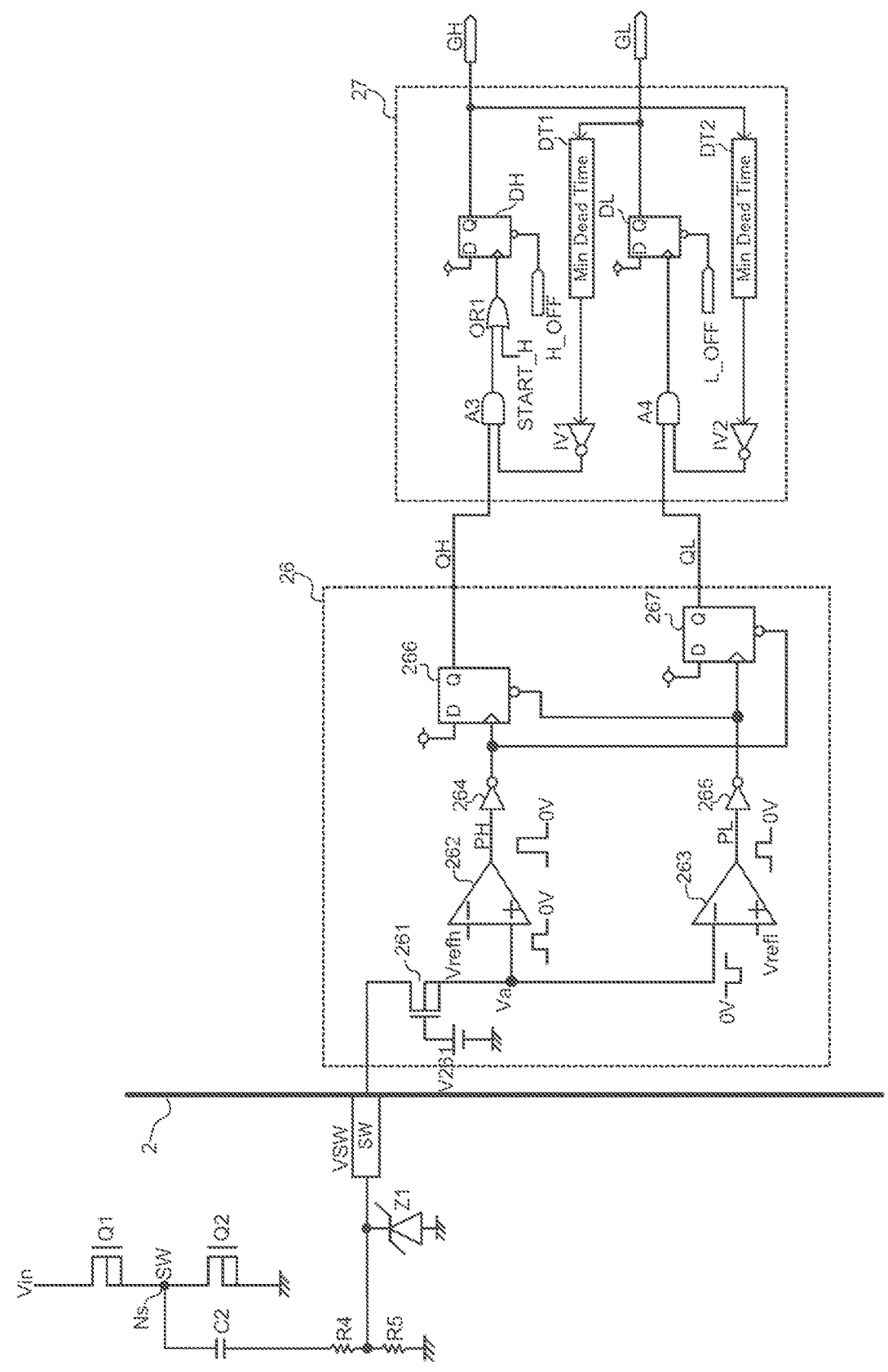
FIG. 11 is a circuit diagram showing one configuration example of an on-timing controller and a switching controller.

The high-side off-signal H_OFF and the low-side off-signal L_OFF are fed to the switching controller 27. As shown in FIG. 11, which will be described later, in the switching controller 27, the high-side off-signal H_OFF is fed to the reset terminal of a high-side D flip-flop DH and the low-side off-signal L_OFF is fed to the reset terminal of a low-side D flip-flop DL.

With this, when the resonant voltage detection signal VCR' surpasses the high-side off-threshold value VTTH', by the operation of the high-side comparator 24, the high-side off-signal H_OFF is switched to High, the high-side D flip-flop DH is reset, the gate driving signal GH is switched to Low, and the switching element Q1 is turned off.

When the resonant voltage detection signal VCR' falls below the low-side off-threshold value VTHL', by the operation of the low-side comparator 25, the low-side off-signal L_OFF is switched to High, the low-side D flip-flop DL is reset, the gate driving signal GL is switched to Low, and the switching element Q2 is turned off.

6. Determining the On-Timing of the Switching Element

As shown in FIG. 10, the power control IC 2 is configured to control the on-timing of switching. An on-timing controller 26, based on the switching voltage detection signal VSW appearing at the SW terminal, outputs a high-side on-signal QH and a low-side on-signal QL. The switching controller 27 generates, based on the high-side and low-side on signals QH and QL and the high-side and low-side off-signals H_OFF and L_OFF, the gate driving signals GH and HL.

FIG. 11 is a circuit diagram showing one configuration example of the on-timing controller 26 and the switching controller 27.

As shown in FIG. 11, the on-timing controller 26 has a transistor 261, comparators 262 and 263, inverters 264 and 265, and D flip-flops 266 and 267.

The drain of the transistor 261 configured as an n-channel MOSFET is connected to the SW terminal. To the gate of the transistor 261, a reference voltage V261 is applied. The source of the transistor 261 is, together with the non-inverting input terminal of the comparator 262, connected to the inverting input terminal of the comparator 263.

To the non-inverting input terminal of the comparator 262, a positive reference voltage Vrefh is applied. The output terminal of the comparator 262 is connected to the input terminal of the inverter 264. The output terminal of the inverter 264 is, together with the clock terminal of the D flip-flop 266, connected to the reset terminal of the D flip-flop 267. To the non-inverting input terminal of the comparator 263, a negative reference voltage Vrefl is applied. The output terminal of the comparator 263 is connected to the input terminal of the inverter 265. The output terminal of the inverter 265 is, together with the clock terminal of the D flip-flop 267, connected to the reset terminal of the D flip-flop 266.

From the Q output terminal of the D flip-flop 266, the high-side on-signal QH is output, and from the Q output terminal of the D flip-flop 267, the low-side on-signal QL is output. The on-timing controller 26 will be described in detail later.

As shown in FIG. 11, the switching controller 27 has AND circuits A3 and A4, inverters IV1 and IV2, an OR circuit OR1, a high-side D flip-flop DH, a low-side D flip-flop DL, and minimum dead time circuits DT1 and DT2.

To one input terminal of the AND circuit A3, the high-side on-signal QH is fed, and to the other input terminal of the AND circuit A3, the output of the minimum dead time circuit DT1 is fed via the inverter IV1.

The output terminal of the AND circuit A3 is connected to one input terminal of the OR circuit OR1. To the other input terminal of the OR circuit OR1, a start-up signal START_H is fed. The output terminal of the OR circuit OR1 is connected to the clock terminal of the high-side D flip-flop DH.

When the start-up signal START_H is raised to High, the high-side D flip-flop DH switches the driving signal GH to High to make a shift to a switching operation state. In switching operation state, the start-up signal START_H is Low, and thus the output level of the OR circuit OR1 agrees with the output of the AND circuit A3.

The minimum dead time circuit DT1 starts counting on detecting the gate driving signal GL switching to Low. On completing the counting of a predetermined period corresponding to the minimum dead time, the minimum dead time circuit DT1 feeds its output, which is now Low, to the inverter IV1. Even when the on-timing controller 26 switches the high-side on-signal QH to High, until completion of the counting of the predetermined period mentioned above, the signal fed from the inverter IV1 to the AND circuit A3 is Low, and thus the output of the AND circuit A3 stays Low. Then, on completion of the counting of the predetermined period mentioned above, the output of the inverter IV1 is switched to High, and thus the output of the AND circuit A3 is switched to High. When the high-side on-signal QH is switched to High after completion of the counting of the predetermined period mentioned above, the output of the AND circuit A3 is switched to High at that time point.

When the output of the AND circuit A3 is switched to High, the gate driving signal GH fed from the Q output terminal of the high-side D flip-flop DH is switched to High, and the switching element Q1 is turned on. In this way, the dead time (simultaneously off period) after the switching element Q2 is turned off and before the switching element Q1 is turned on is adjusted, and the dead time equal to or longer than the minimum dead time is secured.

To one input terminal of the AND circuit A4, the low-side on-signal QL is fed, and to the other input terminal of the AND circuit A4, the output of the minimum dead time circuit DT2 is fed via the inverter IV2. The output terminal of the AND circuit A4 is connected to the clock terminal of the low-side D flip-flop DL.

The minimum dead time circuit DT2 starts counting on detecting the gate driving signal GH switching to Low. On completing the counting of the predetermined period corresponding to the minimum dead time, the minimum dead time circuit DT2 feeds its output, which is now Low, to the inverter IV2. Even when the on-timing controller 26 switches the low-side on-signal QL to High, until completion of the counting of the predetermined period mentioned above is completed, the signal fed from the inverter IV2 to the AND circuit A4 is Low, and thus the output of the AND circuit A4 stays Low. Then, on completion of the counting of the predetermined period mentioned above, the output of the inverter IV2 is switched to High, and thus the output of the AND circuit A4 is switched to High. When the low-side on-signal QL is switched to High after completion of the counting of the predetermined period mentioned above, the output of the AND circuit A4 is switched to High at that time point.

When the output of the AND circuit A4 is switched to High, the gate driving signal GL fed from the Q output terminal of the low-side D flip-flop DL is switched to High, and the switching element Q2 is turned on. In this way, the dead time after the switching element Q1 is turned off and before the switching element Q2 is turned on is adjusted, and the dead time equal to or longer than the minimum dead time is secured.

7. Behavior of the Switching Voltage

Here, prior to the description of operation of the on-timing controller 26, the behavior of the switching voltage SW will be described with reference to FIGS. 12 and 13.

FIG. 12 is a diagram showing the behavior of the resonant current Ir and the switching voltage SW as the switching elements Q1 and Q2, which are off and on respectively at first, go through the simultaneously off state to become on and off respectively. In FIG. 12, and in FIG. 13, which will be described later, there are shown a resonant inductor Lr connected in series with the primary winding Np, body diodes BD1 and BD2 of the switching elements Q1 and Q2, and a parasitic capacitance CC between the drain and the source of the switching element Q2. A configuration may be adopted in which a separate capacitive element is connected in parallel with the parasitic capacitances CC.

The input voltage Vin here is, for example, 400 V.

As shown in FIG. 12, when the switching elements Q1 and Q2 are off and on respectively, the resonant current Ir flows through the resonant inductor Lr, the connection node Ns, and the switching element Q2 in this order. Here, the switching voltage SW is 0 V.

Then, when the switching elements Q1 and Q2 are both turned off at a time point t121 and the dead time starts, the resonant current Ir starts to flow from the connection node Ns via the body diode BD1 of the switching element Q1. Here, charging of the parasitic capacitance CC is started and the switching voltage SW starts to rise.

The switching voltage SW, when it rises to reach 400 V at a time point t122, becomes constant at 400 V. If the switching element Q1 can be turned on at the time point t122 at which the switching voltage SW reaches 400 V, turning on by ZVS can be performed accurately. Turning on the switching element Q1 earlier than the time point t122 would result in hard switching of the switching element Q1, and turning on the switching element Q1 later than the time point t122 would result in wasteful power consumption due to the current flowing through the body diode BD1.

Figure 13:
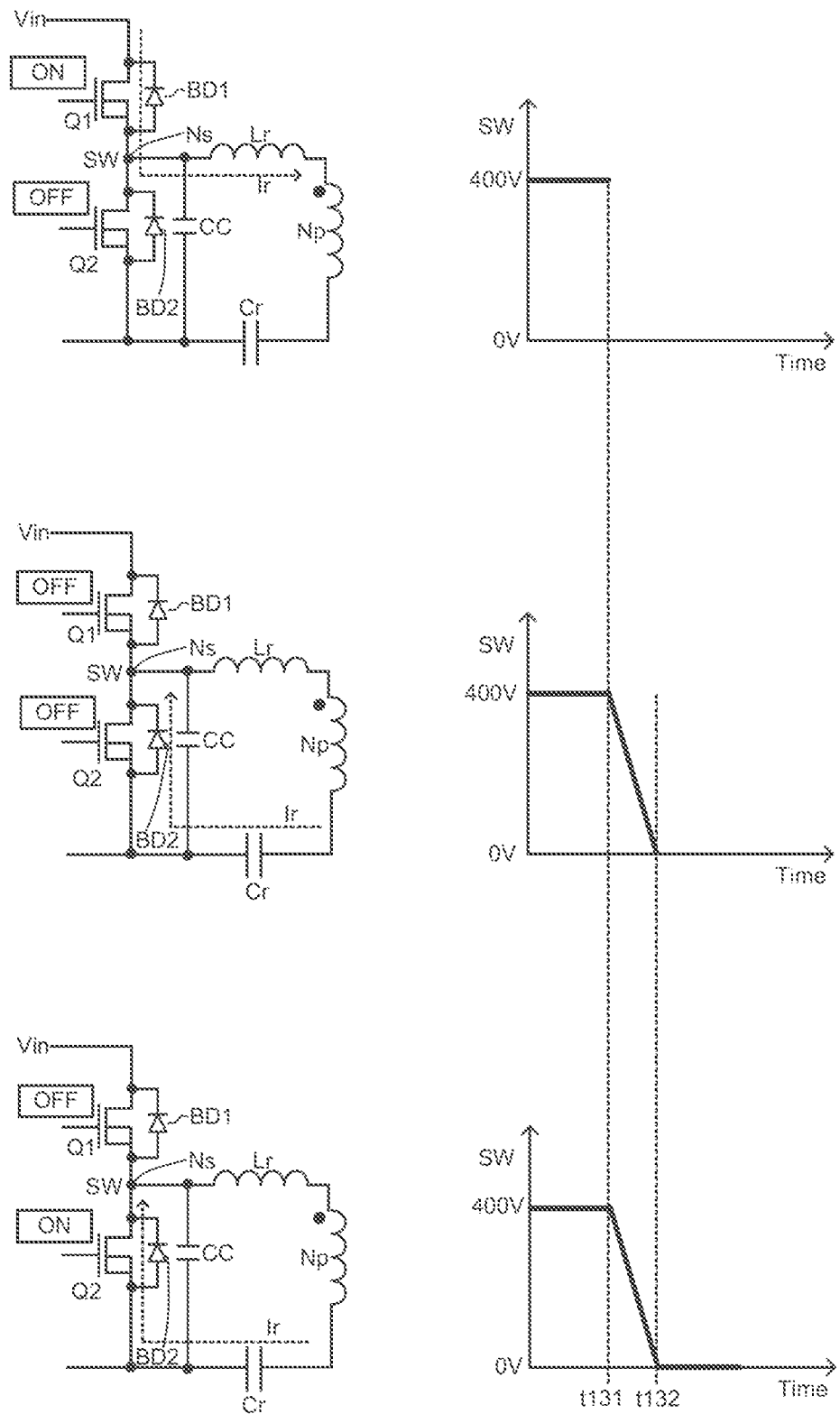
FIG. 13 is a diagram showing the behavior of the resonant current and the switching voltage at transition of switching status.

FIG. 13 is a diagram showing the behavior of the resonant current Ir and the switching voltage SW as the switching elements Q1 and Q2, which are on and off respectively at first, go through the simultaneously off state to become off and on respectively.

As shown in FIG. 13, when the switching elements Q1 and Q2 are on and off respectively, the resonant current Ir flows through the switching element Q1, the connection node Ns, and the resonant inductor Lr in this order. Here, the switching voltage SW is 400 V.

Then, when the switching elements Q1 and Q2 are both turned off at a time point t131 and the dead time starts, the resonant current Ir flows from the resonant capacitor Cr via the body diode BD2 of the switching element Q2 toward the connection node Ns. Here, discharging of the parasitic capacitance CC is started, and the switching voltage SW starts to fall.

The switching voltage SW, when it falls to reach 0 V at a time point t132, becomes constant at 0 V. If the switching element Q2 can be turned on at the time point t132 at which the switching voltage SW reaches 0 V, turning on by ZVS can be performed accurately. Turning on the switching element Q2 earlier than the time point t132 would result in hard switching of the switching element Q2, and turning on the switching element Q2 later than the time point t132 would result in wasteful power consumption due to the current flowing through the body diode BD2.

8. Operation of the On-Timing Controller

Figure 14:
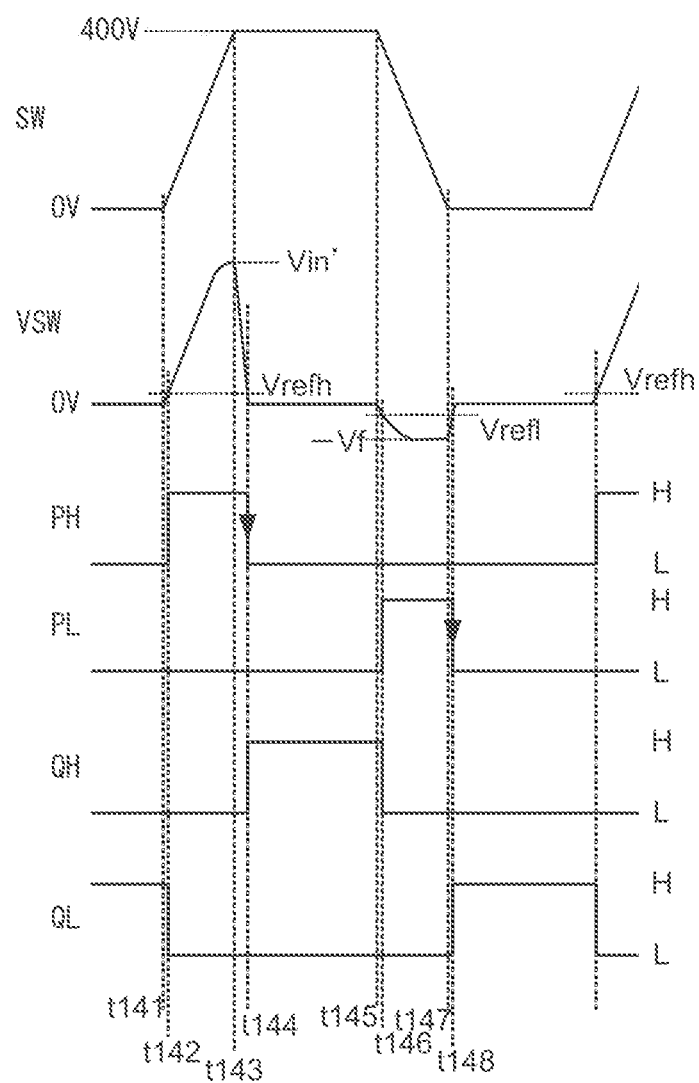
FIG. 14 is a timing chart showing an example of operation of the on-timing controller.

Next, the operation of the on-timing controller 26 will be described with reference to a timing chart shown in FIG. 14. FIG. 14 shows, from top down, the switching voltage SW, the switching voltage detection signal VSW, the output PH of the comparator 262, the output PL of the comparator 263, the high-side on-signal QH, and the low-side on-signal QL.

When the switching element Q2 is turned from on to off, at a time point t141 at which the switching elements Q1 and Q2 are both turned off, the switching voltage SW starts to rise from 0 V due to the charging of the parasitic capacitance by the resonant current. Here, owing to the circuit composed of the capacitor C2 and the resistors R4 and R5 arranged between the connection node Ns and the application terminal for the ground potential, the switching voltage detection signal VSW starts to rise from 0 V.

Here, the transistor 261 limits the switching voltage detection signal VSW fed to the drain to equal to or lower than a predetermined voltage which is lower than the reference voltage V261 by the threshold voltage Vgs between the gate and the source. Thus, the comparator 262 compares the limited analogue signal Va with the positive reference voltage Vrefh. The comparator 262, when the analogue signal Va is equal to or lower than the reference voltage Vrefh, outputs a Low output PH, and when the analogue signal Va is higher than the reference voltage Vrefh, outputs a High output PH. The comparator 262 shapes the analogue signal Va fed to it into a pulsating output PH.

The comparator 263 compares the limited analogue signal Va with the negative reference voltage Vrefl. The comparator 263, when the analogue signal Va is equal to or higher than the reference voltage Vrefl, outputs a Low output PL, and when the analogue signal Va is lower than the reference voltage Vrefl, outputs a High output PL. The comparator 263 shapes the fed analogue signal Va into a pulsating output PL.

With reference back to FIG. 14, starting at the time point t141, the switching voltage detection signal VSW starts to rise, and at a time point t142, when the analogue signal Va surpasses the reference voltage Vrefh, the output PH is switched to High, the D flip-flop 267 is reset, and the low-side on-signal QL is switched to Low.

Then, the switching voltage detection signal VSW continues to rise, and at a time point t143 at which the switching voltage SW reaches 400 V, the switching voltage detection signal VSW starts to fall to 0 V. The switching voltage detection signal VSW rises up to a predetermined voltage Vin' resulting from voltage division by the resistors R4 and R5. However, the voltage Vin' is limited by the transistor 261. Thus, it is not necessary to give the comparators 262 to 263 high withstand voltages.

At a time point t144 at which the analogue signal Va falls to the reference voltage Vrefh or lower due to the drop of the switching voltage detection signal VSW, the output PH is switched to Low. Consequently, the output of the inverter 264 rises to High, the D flip-flop 266 switches the high-side on-signal QH to High, the gate driving signal GH is switched to High, and the switching element Q1 is turned on.

In this way, the moment that, with the switching elements Q1 and Q2 both in the off state, the switching voltage SW reaches 400 V is detected based on the drop of the switching voltage detection signal VSW and the switching element Q1 is turned on. This makes it possible to accurately perform ZVS during the turning on of the switching element Q1 and helps improve efficiency.

When the switching elements Q1 and Q2 are on and off respectively, the switching voltage SW is kept at 400 V. Then, as a result of the switching element Q1 turning from on to off, at a time point t145 at which the switching elements Q1 and Q2 both become off, the switching voltage SW starts falling from 400 V due to the discharging of the parasitic capacitance by the resonant current. Here, the switching voltage detection signal VSW starts to fall from 0 V, and at a time point t146 at which the analogue signal Va falls below the reference voltage Vrefl, the output PL is switched to High, the D flip-flop 266 is reset, and the high-side on-signal QH is switched to Low.

Then, the switching voltage detection signal VSW continues to fall, but the Zener diode Z1 limits, with its forward voltage Vf, the switching voltage detection signal VSW to −Vf or higher. This helps suppress malfunctioning resulting from a negative voltage being applied to the chip substrate of the power control IC 2.

Then, at a time point t147 at which the switching voltage SW reaches 0 V, the switching voltage detection signal VSW starts to rise to 0 V. At a time point t148 at which the analogue signal Va becomes equal to or higher than the reference voltage Vrefl due to the rise of the switching voltage detection signal VSW, the output PL is switched to Low. Consequently, the output of the inverter 265 rises to High, the D flip-flop 267 switches the low-side on-signal QL to High, the gate driving signal GH is switched to High, and the switching element Q2 is turned on.

In this way, the moment at which, with the switching elements Q1 and Q2 both in the off state, the switching voltage SW reaches 0 V is detected based on the rise of the switching voltage detection signal VSW and the switching element Q2 is turned on. This makes it possible to accurately perform ZVS during turning on of the switching element Q2 and helps improve efficiency.

The slew rate when the switching voltage SW rises to 400 V or falls to 0 V changes depending on the magnitude of the load of the LLC resonant converter 52 (that is, the value of the current remaining in the transformer Tr when the dead time starts) and the magnitude of the parasitic capacitance CC. In this embodiment, the moment at which the switching voltage reaches 400 V or 0 V can be detected by the switching voltage detection signal VSW in accordance to varying slew rate, and thus it is possible to accurately perform ZVS during turn-on.

9. Example of Waveforms in Switching Operation State

Figure 15:
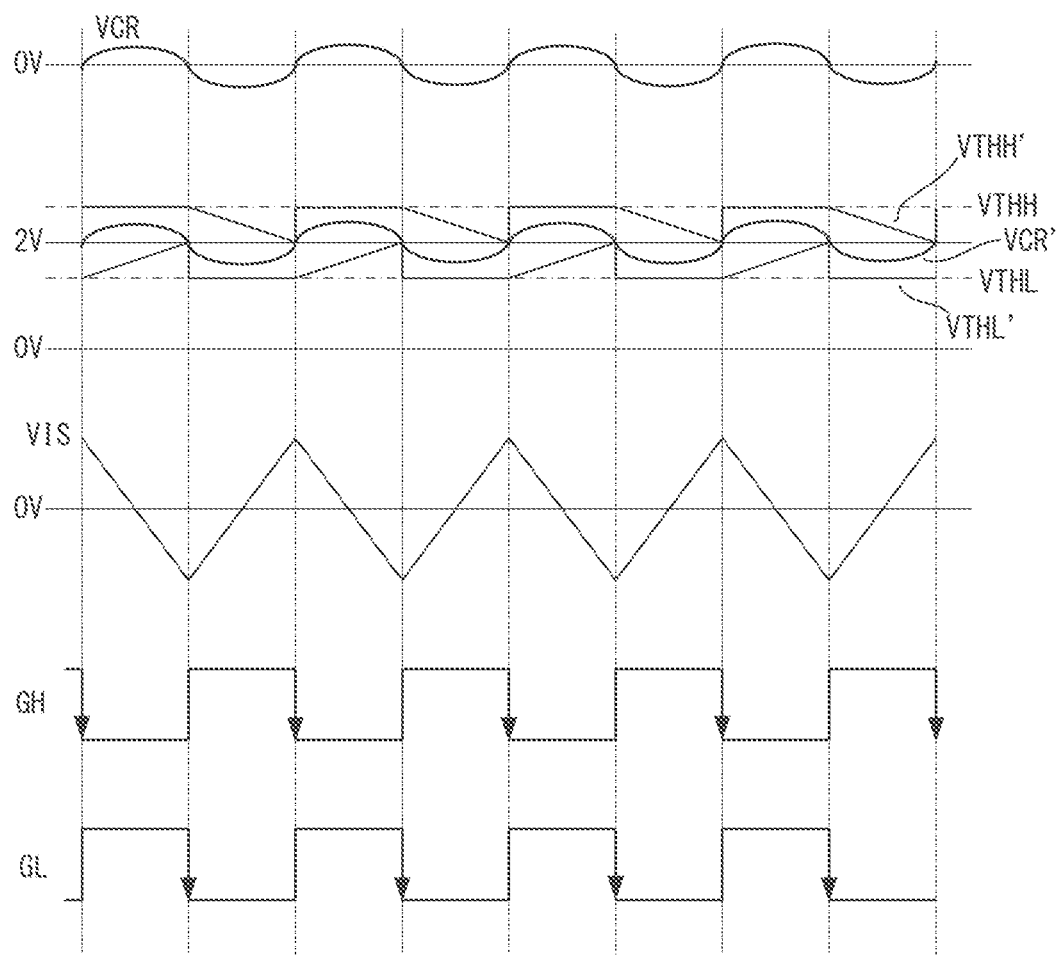
FIG. 15 is a timing chart showing the waveforms of relevant signals under a light load.
Figure 16:
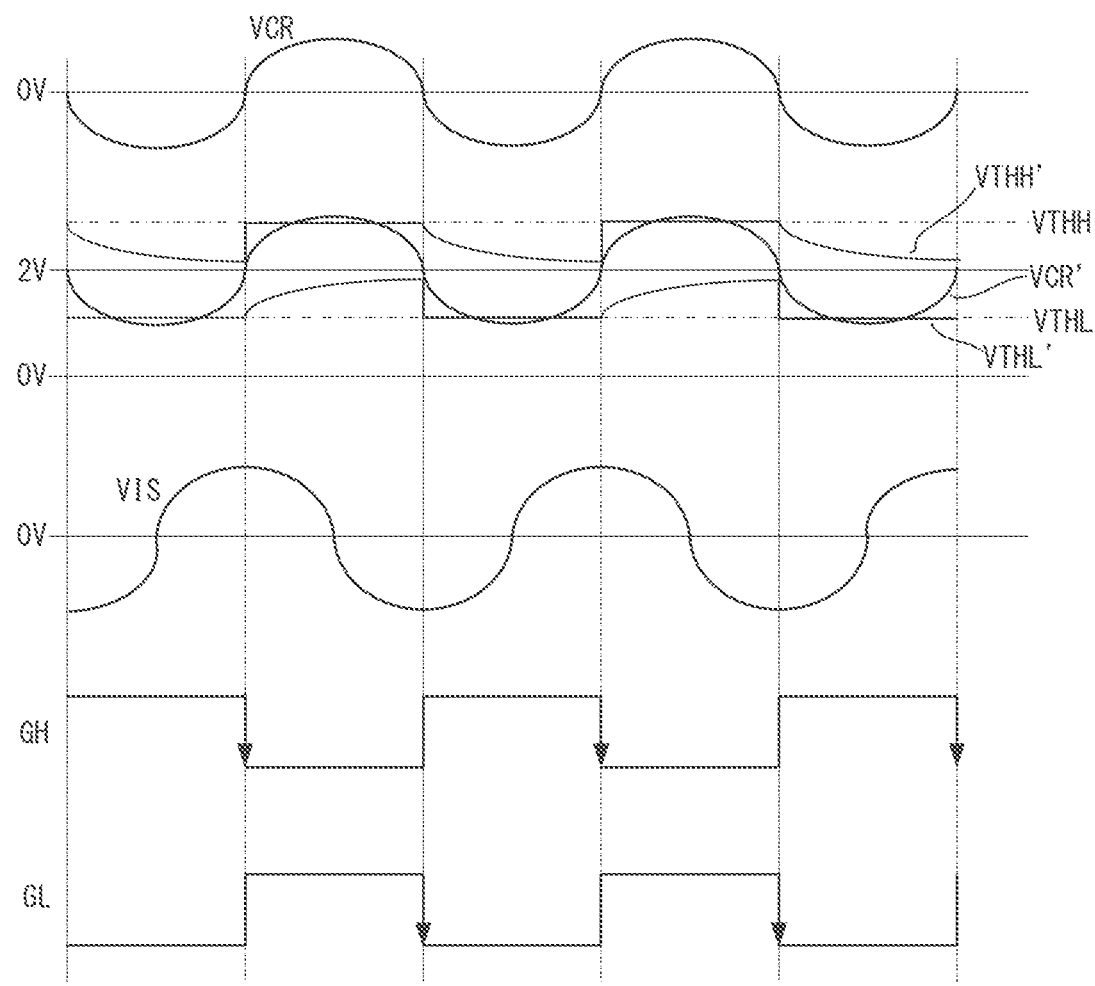
FIG. 16 is a timing chart showing the waveforms of relevant signals under a heavy load.

FIG. 15 is a timing chart showing the waveforms of relevant signals when the load of the LLC resonant converter 52 is light. FIG. 16 is a timing chart showing the waveforms of relevant signals when the load of the LLC resonant converter 52 is heavy. FIGS. 15 and 16 both show, from top down, the resonant voltage detection signal VCR, the resonant voltage detection signal VCR', the resonant current detection signal VIS, and the gate driving signals GH and GL. The resonant voltage detection signal VCR' is shown together with the high-side and low-side off-threshold values VTHH' and VTHL'.

In this example, it is assumed that the resonant voltage detection signal VCR' is level-shifted to be centered around 2 V relative to the resonant voltage detection signal VCR centered around 0 V. That is, the supply voltage V23 (FIG. 10) is assumed to be 4 V, and the resistance ratio of the resistor R231 to the resistor R232 is assumed to be 1:1. The voltage Vnc (=V212) is assumed to be, for example, 2 V.

Under a heavy load as shown in FIG. 16, as compared to under a light load as shown in FIG. 15, the value of the feedback voltage Vfb is high, and thus the deviation between the high-side off-threshold value VTHH and the low-side off-threshold value VTHL is large. In both FIGS. 15 and 16, when the gate driving signal GH is switched to the on-level (High), the sink current I222 starts to flow and the high-side off-threshold value VTHH' falls. Then, at the time point at which the resonant voltage detection signal VCR' surpasses the high-side off-threshold value VTHH', the gate driving signal GH is switched to the off-level (Low). Also, in both FIGS. 15 and 16, when the gate driving signal GL is switched to the on-level (High), the source current I223 starts to flow, and the low-side off-threshold value VTHL' rises. Then, at the time point at which the resonant voltage detection signal VCR' falls below the low-side off-threshold value VTHL', the gate driving signal GL is switched to the off-level (Low).

10. Modified Example

Figure 17:
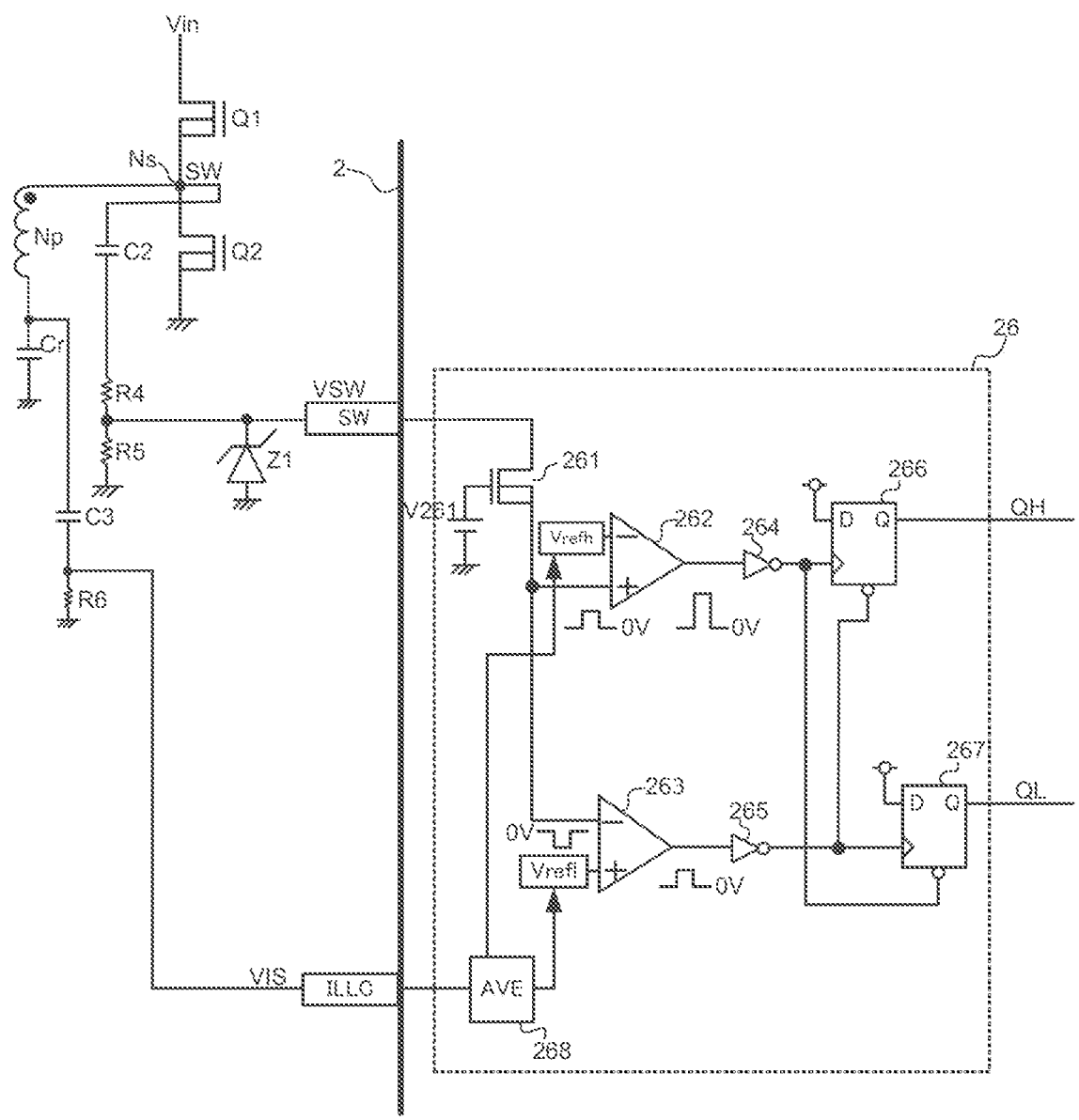
FIG. 17 is a circuit diagram showing one modified example of the on-timing controller.

FIG. 17 is a circuit diagram showing the configuration of the on-timing controller 26 according to a modified example. A difference of the configuration shown in FIG. 17 from the one shown in FIG. 11 described earlier is that an average detector 268 is provided.

Depending on the magnitude of the load, the slew rate of the switching voltage SW as observed when the switching elements Q1 and Q2 are both off changes. When the slew rate is low, the positive and the negative peaks of the switching voltage detection signal VSW are small, and this may make comparison with the fixed reference voltages Vrefh and Vrefl impossible.

To cope with that, in the modified example shown in FIG. 17, the magnitude of the load is detected by detecting the positive-side average value of the resonant current detection signal VIS with the average detector 268 to change the reference voltages Vrefh and Vrefl according to the detection result. The magnitude of the load may be detected based on, instead of the average of the resonant current detection signal VIS, the positive-side peak value, for example.

11. Burst Operation

Figure 18:
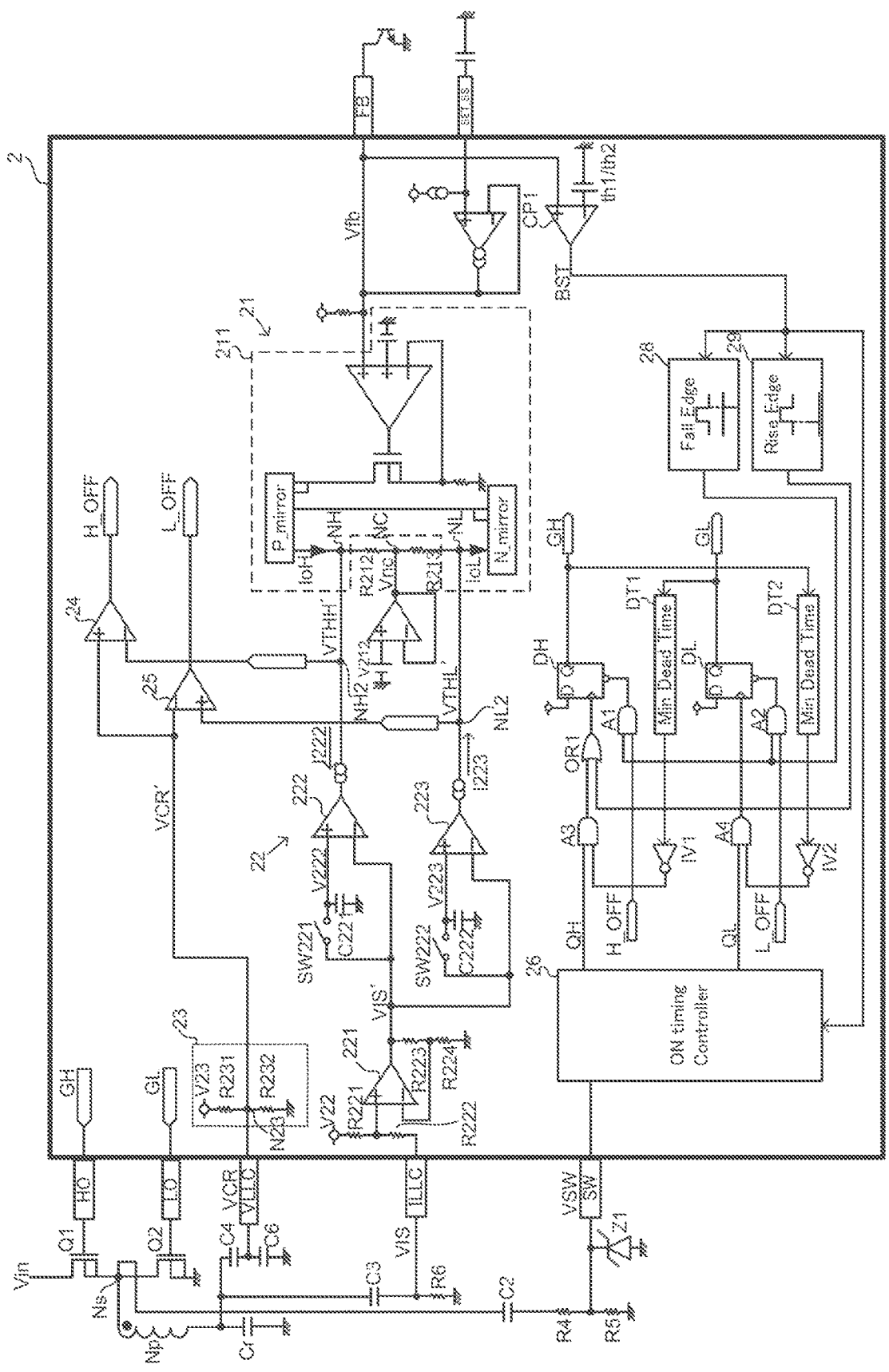
FIG. 18 is a circuit diagram showing another configuration example of the power control IC.

FIG. 18 is a circuit configuration diagram showing one modified example of the power control IC 2. FIG. 18 shows a configuration that includes, in addition to the components shown in FIGS. 10 and 11 described earlier, components for performing burst operation. More specifically, the power control IC 2 shown in FIG. 18 has a falling edge detector 28, a rising edge detector 29, a comparator CP1, and AND circuits A1 and A2.

The output terminal of the high-side comparator 24 is connected to one input terminal of the AND circuit A1. The other input terminal of the AND circuit A1 is connected to the output terminal of the falling edge detector 28. The output of the falling edge detector 28 is High in the switching operation state, and the output of the AND circuit A1 corresponds to the level of the high-side off-signal H_OFF. The output terminal of the AND circuit A1 is connected to the reset terminal of the high-side D flip-flop DH.

The output terminal of the low-side comparator 25 is connected to one input terminal of the AND circuit A2. The other input terminal of the AND circuit A2 is connected to the output terminal of the falling edge detector 28. The output of the falling edge detector 28 is High in the switching operation state, and the output of the AND circuit A2 corresponds to the level of the low-side off-signal L_OFF. The output terminal of the AND circuit A2 is connected to the reset terminal of the low-side D flip-flop DL.

The other input terminal of the OR circuit OR1 is connected to the output terminal of the rising edge detector 29.

The non-inverting input terminal of the comparator CP1 is connected to the FB terminal. The comparator CP1 is a hysteresis comparator which compares the feedback voltage Vfb appearing at the FB terminal with the first threshold value th1 and the second threshold value th2. The first threshold value th1 is smaller than the second threshold value th2, with the first threshold value th1 set at, for example, 0.1 V and the second threshold value th2 set at, for example, 0.15 V.

Figure 19:
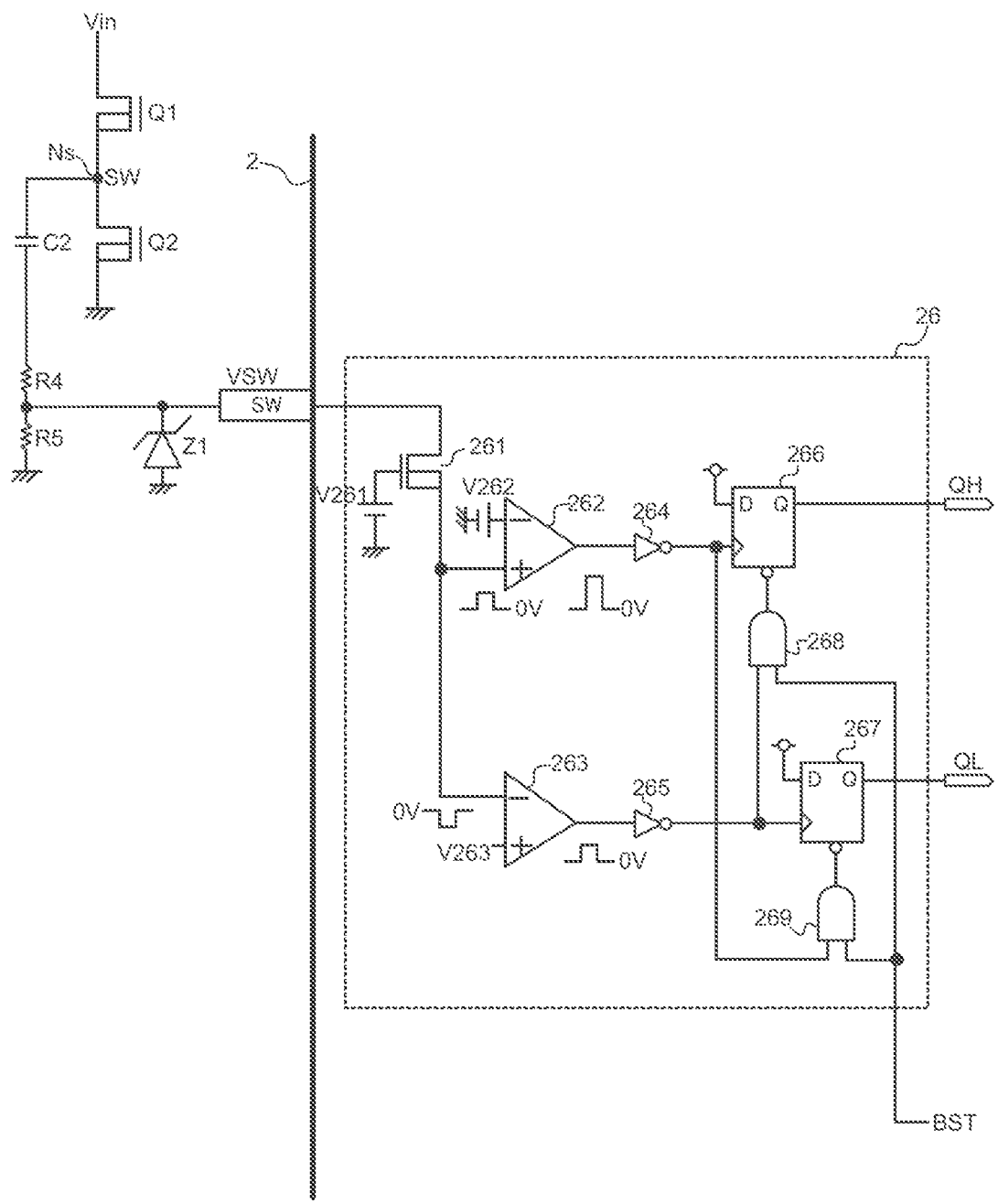
FIG. 19 is a circuit diagram showing another modified example of the on-timing controller.

FIG. 19 is a diagram showing the internal configuration of the on-timing controller 26 in the configuration shown in FIG. 18. The on-timing controller 26 shown in FIG. 19 has, in addition to the components shown in FIG. 17, AND circuits 268 and 269. One input terminal of the AND circuit 268 is connected to the output terminal of the inverter 265, and the other input terminal is connected to the output terminal of the comparator CP1. That is, the output BST of the comparator CP1 is fed to the other input terminal of the AND circuit 268. One input terminal of the AND circuit 269 is connected to the output terminal of the inverter 264, and the other input terminal is connected to the output terminal of the comparator CP1. That is, the output BST of the comparator CP1 is fed to the other input terminal of the AND circuit 269.

Burst operation in the configuration shown in FIG. 18 and described above will now be described.

When the output voltage Vout of the LLC resonant converter 52 becomes equal to or lower than a target voltage, the feedback voltage Vfb surpasses the second threshold value th2 and the output BST of the comparator CP1 is switched to High. The rising edge detector 29, upon detecting the rise of the output BST, feeds an output that rises from Low to High and then instantly falls to Low to the OR circuit OR1. As a result, the gate driving signal GH output from the high-side D flip-flop DH is switched to High to make a shift to the switching operation state. Here, in the on-timing controller 26 (FIG. 19), with the output BST raised to High, the outputs of the inverters 265 and 264 that are fed to the AND circuits 268 and 269 become valid.

Then, when the output voltage Vout rises to surpass the target voltage, the feedback voltage Vfb starts to fall. When the feedback voltage Vfb falls below the first threshold value th1, the output BST is switched to Low. The falling edge detector 28, upon detecting the fall of the output BST, feeds an output that falls from High to Low and then instantly rises to High to the AND circuits A1 and A2. As a result, the high-side and low-side D flip-flops DH and DL are reset, and the gate driving signals GH and GL are switched to Low to make a shift to a switching halt state. Here, with the output BST switched to Low, in the on-timing controller 26 (FIG. 19), the outputs of the AND circuits 268 and 269 are Low and the high-side and low-side on-signals QH and QL are Low to prevent the gate driving signals GH and GL from turning to High.

Then, when the output voltage Vout falls to become equal to or lower than the target voltage, the feedback voltage Vfb surpasses the second threshold value th2 to make a shift back to the switching operation state as described above. In this way, burst operation in which switching operation is performed intermittently is performed.

12. Coordination between the Power Control IC and the PFC Circuit

Next, a coordinating function between the power control IC 2 and the PFC circuit 51 will be described. FIG. 20 is a circuit diagram showing a principal portion involved in the coordinating function in the power control IC 2 and an internal configuration example of the PFC control IC 1.

As shown in FIG. 20, the PFC control IC 1 (control portion) has an error amplifier 11, a comparator 12, and a driver 13. The connection node N51 at which the resistors R1 and R2 are connected together in the PFC circuit 51 is connected to the inverting input terminal of the error amplifier 11. To the non-inverting input terminal of the error amplifier 11, a reference voltage V11 (for example, 2.5 V) is applied. The output terminal of the error amplifier 11 is connected to an external capacitor C11 and also to the non-inverting input terminal of the comparator 12.

The error amplifier 11 is configured as a transconductance amplifier which compares the feedback voltage REF obtained by dividing the output voltage PFC_OUT (=Vin) of the PFC circuit 51 with the resistors R1 and R2 with a reference voltage V11 to output a current corresponding to the difference between the feedback voltage REF and the reference voltage V11. The voltage Vcp generated by the output current of the error amplifier 11 and the capacitor C11 is fed to the non-inverting input terminal of the comparator 12. To the inverting input terminal of the comparator 12, a sawtooth signal is fed.

The comparator 12 feeds the driver 13 with the result, in the form of a PWM signal, of comparison of the voltage Vcp with the sawtooth signal. The driver 13 performs the on/off driving of the switching element M1 based on the PWM signal. In this way, through PWM control based on the feedback voltage RFE, the output voltage PFC_OUT is controlled to remain at a target voltage which depends on the reference voltage V11 and the voltage dividing ratio of the resistors R1 and R2. The PFC control IC 1 may be configured to perform, instead of PWM control, fixed on-width control, for example.

On the other hand, the power control IC 2 includes a constant current source 201, a transistor 202, a comparator 203, an AND circuit 204, a D flip-flop 205, an inverter 206, a comparator 207, a D flip-flop 208, an inverter 209, timers 210 and 211, a D flip-flop 212, a falling edge detector 213, and an AND circuit 214.

The constant current source 201, the transistor 202, the comparator 203, the AND circuit 204, the D flip-flop 205, the inverter 206, the comparator 207, the D flip-flop 208, and the inverter 209 constitute a current feeder. The comparator CP1, which will be described later, the timers 210 and 211, and the D flip-flop 212 constitute a burst detector.

The PFC IN terminal is connected to the connection node N51. The output terminal of the constant current source 201 is connected to the source of the transistor 202, which is configured as a p-channel MOSFET. The drain of the transistor 202 is connected to the PFC_IN terminal. The non-inverting input terminal of the comparator 203 is connected to the PFC_IN terminal. To the non-inverting input terminal of the comparator 203, a reference voltage V203 (for example, 2.4 V) is applied.

The output terminal of the comparator 203 is connected to one input terminal of the AND circuit 204. The output terminal of the AND circuit 204 is connected to the clock terminal of the D flip-flop 205. The Q output terminal of the D flip-flop 205 is connected to the input terminal of the inverter 206. The output terminal of the inverter 206 is connected to the gate of the transistor 202.

The inverting input terminal of the comparator 207 is connected to the PFC_IN terminal. To the non-inverting input terminal of the comparator 207, a reference voltage V207 (for example, 2.6 V) is applied. The output terminal of the comparator 207 is connected to the clock terminal of the D flip-flop 208. The reset terminal of the D flip-flop 208 is connected to the output terminal of the AND circuit 204. The Q output terminal of the D flip-flop 208 is connected to the input terminal of the inverter 209. The output terminal of the inverter 209 is connected to one input terminal of the AND circuit 214.

The output BST output from the comparator CP1 described earlier (illustrated also in FIG. 10) is fed to the timers 210 and 211. The output of the timer 210 is fed to the clock terminal of the D flip-flop 212. The output of the timer 211 is fed to the reset terminal of the D flip-flop 212. The Q output terminal of the D flip-flop 212 is connected to the other input terminal of the AND circuit 204 and to the input terminal of the falling edge detector 213. The falling edge detector 213 is a one-shot circuit which, upon detecting the fall from High to Low of the input signal, outputs Low only momentarily.

Figure 21:
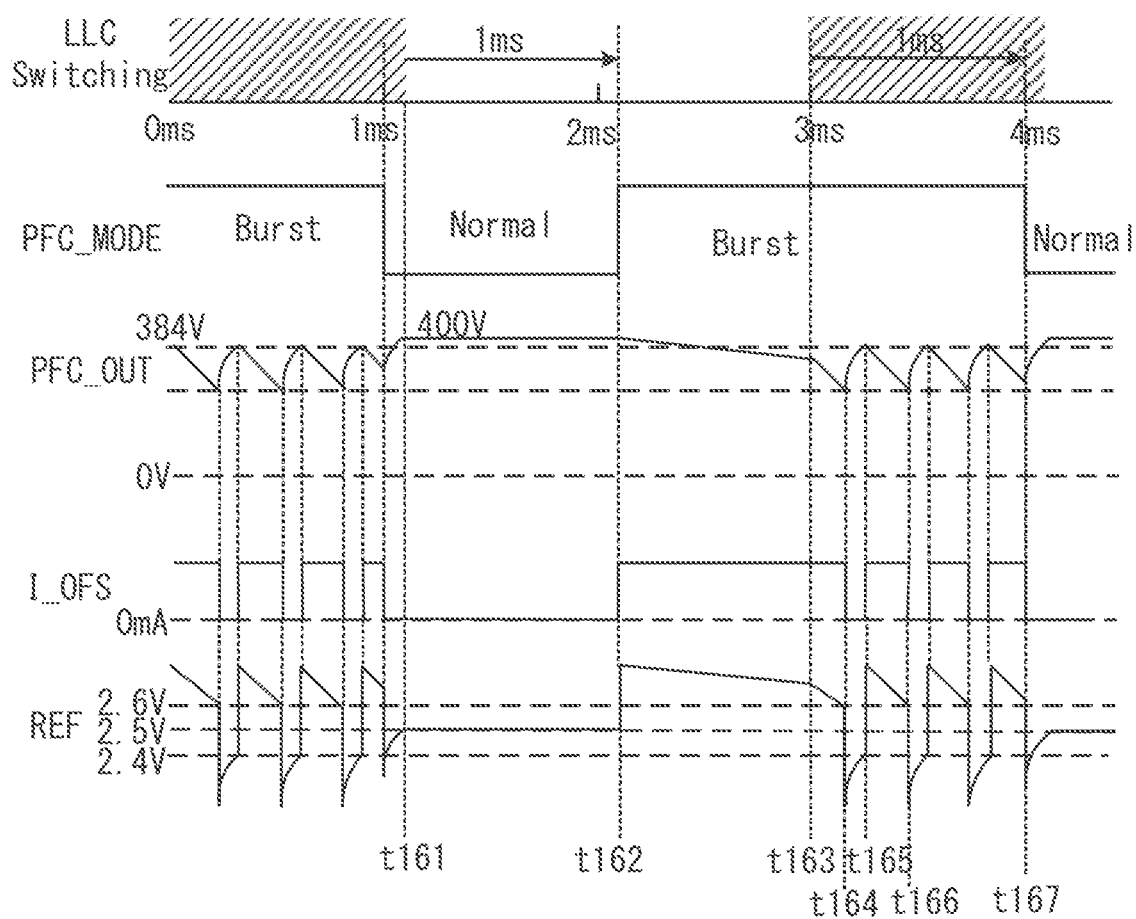
FIG. 21 is a timing chart showing one example of coordinated operation between the power control IC and the PFC circuit.

Coordinated operation between the power control IC 2 and the PFC circuit 51 so configured will now be described with reference to a timing chart shown in FIG. 21. FIG. 21 shows, from top down, the switching status of the LLC resonant converter 52 as controlled by the power control IC 2, the PFC mode signal PFC_MODE output from the Q output terminal of the D flip-flop 212, the output voltage PFC_OUT, the offset current I_OFS that passes through the transistor 202, and the feedback voltage REF.

In the switching status of the LLC resonant converter 52 shown in FIG. 21, the switching operation state is indicated by hatching. That is, in FIG. 21, the LLC resonant converter 52 performs burst operation in which the switching operation state and the switching halt state alternate.

In FIG. 21, as an example, it is assumed that the reference voltage V11 is 2.5 V, that the reference voltage V203 is 2.4 V, that the reference voltage V207 is 2.6 V, and that the target value of the output voltage PFC_OUT is 400 V.

At a time point t161 at which the feedback voltage Vfb falls below the first threshold value th1 and the output BST is switched to Low, the LLC resonant converter 52 makes a shift from the switching operation state to the switching halt state. The timer 210, upon detecting that the output BST is switched to Low, starts counting, and when the counting of a predetermined time is completed by the time that the output BST is switched to High, the timer 210 judges that the LLC resonant converter 52 is performing burst operation and outputs a signal rising to High to the clock terminal of the D flip-flop 212. As a result, the D flip-flop 212 outputs a High PFC mode signal PFC_MODE from the Q output terminal to the AND circuit 204.

In the example of FIG. 21, after counting is started at the time point t161 by the time that 1 ms, just as an example of the predetermined time, is counted, the output BST is not switched to High and the LLC resonant converter 52 is not shifted to the switching operation state. And thus, the PFC mode signal PFC_MODE is switched to High at a time point t162 to shift the PFC circuit 51 from the normal mode to the burst mode. The timer 210, when the output BST is switched to High by the time that counting of the predetermined time is completed, leaves the PFC mode signal PFC_MODE Low to maintain the normal mode.

As a result, under low power consumption, during which the interval of switching operation state of the LLC resonant converter 52 is longer than the predetermined time, it is possible to shift the PFC circuit 51 into a burst mode.

As shown in FIG. 21, when, at the time point t162, the PFC mode signal PFC_MODE is switched to High, since the feedback voltage REF is controlled to remain at 2.5 V, the output of the comparator 203 is High, and the rise to High is fed from the AND circuit 204 to the clock terminal of the D flip-flop 205. This turns the output of the inverter 206 to Low, and turns the transistor 202 on. As a result, the offset current I_OFS flows from the constant current source 201 through the transistor 202.

Consequently, the feedback voltage REF is raised, and the PFC control IC 1 keeps the switching element M1 off and thus switching is halted. As a result, the output voltage PFC_OUT starts to fall, and the feedback voltage also starts to fall together. Then, in the example of FIG. 16, the LLC resonant converter 52 shifts to the switching operation state at a time point t163, and this increases the rate of fall of the output voltage PFC_OUT and the feedback voltage REF.

Then, when, at a time point t164, the feedback voltage REF falls below 2.6 V, the output of the comparator 207 switches to High; thus, the output from the Q output terminal of the D flip-flop 208 switches to High, and the output of the inverter 209 switches to Low. Thus, the output of the AND circuit 214 turns to Low, and the D flip-flop 205 is reset. As a result, the output of the inverter 206 is turned to High and the transistor 202 is turned off so that the offset current I_OFS stops flowing.

Consequently, the feedback voltage REF stops being raised, and falls to a value lower than 2.4 V. As a result, the PFC control IC 1 starts the switching control of the switching element M1 so that the feedback voltage REF remains at 2.5 V and the feedback voltage REF rises. When, at a time point t165, the feedback voltage REF reaches 2.4 V, the output of the AND circuit 204 switches to High, and by the operation of the D flip-flop 205, the transistor 202 is turned on and the offset current I_OFS flows.

Consequently, the feedback voltage REF is raised, and the PFC control IC 1 stops switching of the switching element M1. As a result, the output voltage PFC_OUT and the feedback voltage REF fall. When, at a time point t166, the feedback voltage REF falls below 2.6 V, by the operation of the D flip-flop 208, the transistor 202 is turned off and the offset current I_OFS stops flowing.

Thereafter, through repetition of the above operation, the switching element M1 repeats the switching operation state and the switching halt state alternately. In this way, burst operation of the PFC circuit 51 is performed.

At the time point t163 at which the output BST switches to High and the LLC resonant converter 52 shifts to the switching operation state, the timer 211 starts counting, and when counting of the predetermined time is completed before the output BST turns to Low, the timer 211 resets the D flip-flop 212 and turns the PFC mode signal PFC_MODE to Low. In the example of FIG. 16, the predetermined time is assumed to be 1 ms, and at a time point t167 that 1 ms has passed after the time point t163, the PFC mode signal PFC_MODE is turned to Low.

When the PFC mode signal PFC_MODE is turned to Low, the D flip-flop 208 is reset, and the output of the inverter 209 turns to High. On the other hand, the falling edge detector 213, upon detecting that the PFC mode signal PFC_MODE is switched to Low, outputs Low only momentarily. As a result, the output of the AND circuit 214 is turned to Low, the D flip-flop 205 is reset, the output of the inverter 206 is turned to High, the transistor 202 is turned off, and the offset current I_OFS stops flowing. Consequently, the feedback voltage REF stops being raised and falls to a value lower than 2.4 V. As a result, the PFC control IC 1 starts the switching control of the switching element M1 so that the feedback voltage REF remains at 2.5 V and the feedback voltage REF rises.

In this way, according to this embodiment, the power control IC 2 has a function of feeding the offset current I_OFS to the connection node N51 of the resistors R1 and R2 which divide the output voltage PFC_OUT of the PFC circuit 51. Upon detecting burst operation of the LLC resonant converter 52, the power control IC 2, by repeating passing and stopping of the current I_OFS, alternates the state of control of the switching element M1 by the PFC control IC 1 between the switching halt state and the switching operation state. In this way, it is possible to make the PFC circuit 51 perform burst operation.

Here, the PFC control IC 1 does not need to be provided with a special circuit. Thus, for example, PFC control ICs 1 of different manufacturers can be used. That is, it is possible to improve the degree of freedom in terms of what PFC control IC 1 to use together with the LLC resonant converter 52. It is also possible to suppress an increase in the number of external components provided between the power control IC 2 and the PFC control IC 1.

As shown in FIG. 20, the power control IC 2 of this embodiment has a UVLO (undervoltage lock-out) comparator 215, with the PFC_IN terminal connected to the non-inverting input terminal of the comparator 215 and a reference voltage applied to the inverting input terminal. The comparator 215 is a hysteresis comparator. Thus, it is possible to feed the comparator 215 with the feedback voltage REF obtained by dividing the output voltage PFC_OUT; when the output voltage PFC_OUT (=Vin) becomes equal to or lower than the detected voltage, the power control IC 2 enters the halt state in which it stops the operation of its internal circuit; when the output voltage PFC_OUT becomes equal to or higher than the recovery voltage, the power control IC 2 recovers from the halt state.

13. Terminal Arrangement of the Power Control IC

The terminal arrangement of the power control IC 2 (FIG. 1) will now be described. Hereinafter, terminals will be described as pin-1 to pin-16.

FIG. 1 is a diagram of the power control IC 2 as an IC package as see from above. In the power control IC 2, an IC chip is fixed to a support (copper frame, etc.). The IC chip is connected to a lead frame (copper frame, etc.) with Au wires or the like. Pin-1 to pin-16 shown in FIG. 1 are configured as a lead frame. The support, the IC chip, and the lead frame are sealed in a sealing material such as molding resin or the like.

To the power control IC 2, which is rectangular as seen from above, pin-1 to pin-8 are arranged along a first side, and pin-9 to pin-16 are arranged in order along a second side opposite from the first side. Pin-1 to pin-8 are opposite from pin-16 to pin-9 one to one.

Pin-1 and pin-14 to pin-16 are high-withstand-voltage terminals to which a voltage which rises up to, for example, about 400 V, is applied. Pin-2 to pin-8 are low-withstand-voltage (for example, 10 V or lower) terminals. Pin-9 to pin-11 are medium-withstand-voltage (for example, 40 V or lower) terminals.

Since a voltage is directly applied from the application terminal of an alternating-current voltage Vac to pin-1, it is separated from pin-3 by leaving the adjacent pin-2 as a non-connect terminal.

In order to avoid proximity short-circuiting to the high-withstand-voltage and medium-withstand-voltage terminals, pin-3 to pin-8 are arranged in a group in a lower part along the first side on the plane of FIG. 1.

In order to avoid short-circuiting between Pin-9 to pin-11 and the high-withstand-voltage terminals, pin-13 is left as a non-connect terminal.

Pin-14 to pin-16, which are high-withstand-voltage terminals, are, in order to avoid proximity short circuiting with the medium-withstand-voltage and low-withstand-voltage terminals, arranged in a group in an upper part along the second side on the plane of FIG. 1. It should however be noted that the voltage difference between pin-14 to pin-16 is about 30 V at most, and thus, short-circuiting between those pins is not a serious problem.

The embodiments of the present invention described above allow for many modifications made without departing from the spirit of the present invention.

What is claimed is:

1. A power control device for controlling driving of an LLC resonant converter including:
    a first switching element to one end of which an input voltage is applied;
    a second switching element of which one end is connected to another end of the first switching element; and
    a primary winding and a resonant capacitor connected in series between a first connection node at which the first and second switching elements are connected together and another end of the second switching element,
    the power control device comprising an on-timing controller configured:
        to detect variation of a switching voltage detection signal based on a rise of a switching voltage appearing at the first connection node up to the input voltage and a fall of the switching voltage down to 0 V, and
        to generate, based on a result of the detection, a high-side on-signal for turning on the first switching element and a low-side on-signal for turning on the second switching element,
    wherein:
    one end of a first capacitor is connected to the first connection node,
    one end of a first resistor is connected to another end of the first capacitor,
    the switching voltage detection signal appears at a second connection node at which the first capacitor and the first resistor are connected together,
    the first capacitor and the first resistor are connected together via a second resistor, and
    the first and second resistors are connected together at the second connection node.

2. The power control device according to claim 1, further comprising:
    a switching controller configured to generate
        a first driving signal for driving the first switching element based on the high-side on- signal and
        a second driving signal for driving the second switching element based on the low- side on-signal,
    wherein
    the switching controller includes:
        a first counting part configured to start counting of a first predetermined period when the second driving signal turns to an off level,
        a first AND circuit to which the high-side on-signal and an output of the first count part are fed,
        a second counting part configured to start counting of a second predetermined period when the first driving signal turns to an off level, and
        a second AND circuit to which the low-side on-signal and an output of the second counting part are fed.

3. The power control device according to claim 1 as an IC package,
    wherein
    a first external terminal for application of the switching voltage detection signal is included in a terminal group of a same withstand voltage arranged along a same side of the IC package.

4. The power control device according to claim 3, further comprising along the same side:
    a second external terminal connected via a diode to a terminal for application of an alternating-current voltage for generating the input voltage; and
    a third external terminal which is a non-connect terminal, wherein
    the third external terminal is arranged between the terminal group and the second external terminal.

5. An LLC resonant converter including the power control device according to claim 1.

6. The LLC resonant converter according to claim 5, comprising:
    a first capacitor of which one end is connected to the first connection node; and
    a first resistor of which one end is connected to another end of the first capacitor is connected,
    wherein
    the switching voltage detection signal appears at a second connection node at which the first capacitor and the first resistor are connected together.

7. A power control device for controlling driving of an LLC resonant converter including:
    a first switching element to one end of which an input voltage is applied;
    a second switching element of which one end is connected to another end of the first switching element; and
    a primary winding and a resonant capacitor connected in series between a first connection node at which the first and second switching elements are connected together and another end of the second switching element,
    the power control device comprising an on-timing controller configured:
        to detect variation of a switching voltage detection signal based on a rise of a switching voltage appearing at the first connection node up to the input voltage and a fall of the switching voltage down to 0 V, and
        to generate, based on a result of the detection, a high-side on-signal for turning on the first switching element and a low-side on-signal for turning on the second switching element,
    wherein the on-timing controller includes:
        a first comparator configured to compare a signal based on the switching voltage detection signal with a positive reference voltage,
        a second comparator configured to compare a signal based on the switching voltage detection signal with a negative reference voltage,
        a first inverter to which an output of the first comparator is fed,
        a second inverter to which an output of the second comparator is fed,
        a first D flip-flop having
            a clock terminal via which an output of the first inverter is fed in,
            a reset terminal via which an output of the second inverter is fed in, and
            an output terminal via which the high-side on-signal is fed out, and
        a second D flip-flop having
            a clock terminal via which the output of the second inverter is fed in,
            a reset terminal via which the output of the first inverter is fed in, and
            an output terminal via which the low-side on-signal is fed out.

8. The power control device according to claim 7,
wherein the on-timing controller includes a first transistor to which the switching voltage detection signal is fed, the first transistor having a control terminal to which a predetermined first reference voltage is applied.

9. The power control device according to claim 7, wherein
the on-timing controller includes a level detector configured to detect a level of a resonant current detection signal, and
the reference voltage varies in accordance with a result of the detection by the level detector.

10. An LLC resonant converter comprising:
a power control device for controlling driving of an LLC resonant converter including:
a first switching element to one end of which an input voltage is applied;
a second switching element of which one end is connected to another end of the first switching element; and
a primary winding and a resonant capacitor connected in series between a first connection node at which the first and second switching elements are connected together and another end of the second switching element,
the power control device comprising an on-timing controller configured
to detect variation of a switching voltage detection signal based on a rise of a switching voltage appearing at the first connection node up to the input voltage and a fall of the switching voltage down to 0 V and
to generate, based on a result of the detection, a high-side on-signal for turning on the first switching element and a low-side on-signal for turning on the second switching element,
wherein the LLC resonant converter further comprises:
a first capacitor of which one end is connected to the first connection node; and
a first resistor of which one end is connected to another end of the first capacitor is connected,
wherein the switching voltage detection signal appears at a second connection node at which the first capacitor and the first resistor are connected together, and
a second resistor via which the first capacitor and the first resistor are connected together,
wherein the first and the second resistors are connected together at the second connection node.

11. An LLC resonant converter comprising:
a power control device for controlling driving of an LLC resonant converter including:
a first switching element to one end of which an input voltage is applied;
a second switching element of which one end is connected to another end of the first switching element and
a primary winding and a resonant capacitor connected in series between a first connection node at which the first and second switching elements are connected together and another end of the second switching element,
the power control device comprising an on-timing controller configured
to detect variation of a switching voltage detection signal based on a rise of a switching voltage appearing at the first connection node up to the input voltage and a fall of the switching voltage down to 0 V and
to generate, based on a result of the detection, a high-side on-signal for turning on the first switching element and a low-side on-signal for turning on the second switching element,
wherein the LLC resonant converter further comprises:
a first capacitor of which one end is connected to the first connection node; and
a first resistor of which one end is connected to another end of the first capacitor is connected,
wherein the switching voltage detection signal appears at a second connection node at which the first capacitor and the first resistor are connected together, and
a Zener diode having a cathode connected to the second connection node, and having an anode to which a ground potential is applied.

* * * * *